United States Patent [19]

Wood et al.

[11] Patent Number: 5,752,212
[45] Date of Patent: May 12, 1998

[54] PROPORTIONAL POLARITY SHIFT WHEEL SLIDE PROTECTION

[75] Inventors: James A. Wood, Spartanburg; David A. Greer, Simpsonville, both of S.C.

[73] Assignee: Westinghouse Air Brake Company, Wilmerding, Pa.

[21] Appl. No.: 436,882

[22] Filed: May 8, 1995

[51] Int. Cl.$^6$ ............................. B60T 8/00; B60T 8/32
[52] U.S. Cl. ............................. 701/71; 701/70; 701/74; 701/75
[58] Field of Search ............... 364/426.01, 426.02, 364/426.03, 426, 426.018, 426.019, 426.015, 426.022, 426.037; 246/168.1; 318/371, 52; 180/197; 371/15.1; 701/70, 71, 74, 75, 79, 80, 82

[56] References Cited

U.S. PATENT DOCUMENTS

| | | | |
|---|---|---|---|
| 3,482,887 | 12/1969 | Sheppard | 303/21 |
| 4,071,282 | 1/1978 | Callahan et al. | 303/168 |
| 4,075,538 | 2/1978 | Plunkett | 318/52 |
| 4,225,813 | 9/1980 | Sahasrabudhe | 318/371 |
| 4,298,940 | 11/1981 | Tadokoro et al. | 701/82 |
| 4,347,569 | 8/1982 | Allen, Jr. et al. | 701/82 |
| 4,410,947 | 10/1983 | Strong et al. | 701/82 |
| 4,486,839 | 12/1984 | Mazur et al. | 701/71 |
| 4,491,920 | 1/1985 | Wood et al. | 701/71 |
| 4,941,099 | 7/1990 | Wood et al. | 701/71 |
| 4,987,543 | 1/1991 | Wood et al. | 701/82 |
| 5,124,988 | 6/1992 | Drake et al. | 395/184.01 |
| 5,168,952 | 12/1992 | Oono et al. | 180/197 |
| 5,244,171 | 9/1993 | Drake et al. | 246/168.1 |
| 5,280,718 | 1/1994 | Drake et al. | 73/129 |
| 5,290,095 | 3/1994 | Wood et al. | 303/133 |
| 5,471,387 | 11/1995 | Wood et al. | 701/71 |

*Primary Examiner*—Emanuel T. Voeltz
*Assistant Examiner*—Vuthe Siek
*Attorney, Agent, or Firm*—James Ray & Associates

[57] ABSTRACT

This invention of a proportional force modulation wheel slide protection process for steel wheel/steel rail vehicles. It applies particularly to self-propelled transit type railway vehicles. It uses a slide detection logic which predicts the force reduction needed to control slippage and correct the slide condition. The force modulation is made on the basis of the initial prediction and the time that a slide has been in effect to determine if greater force reduction is needed to effect a slide correction. Sensing of positive to negative axle rate polarity shift is used to determine when a slide has been corrected and normal braking force can be restored. This process is used to control slides by modulating both the dynamic and friction braking in like manner. The normal braking control devices are used to reduce braking force during slide correction. Although this process could be implemented through the use of discrete circuits, it lends itself to microprocessor applications.

16 Claims, 10 Drawing Sheets

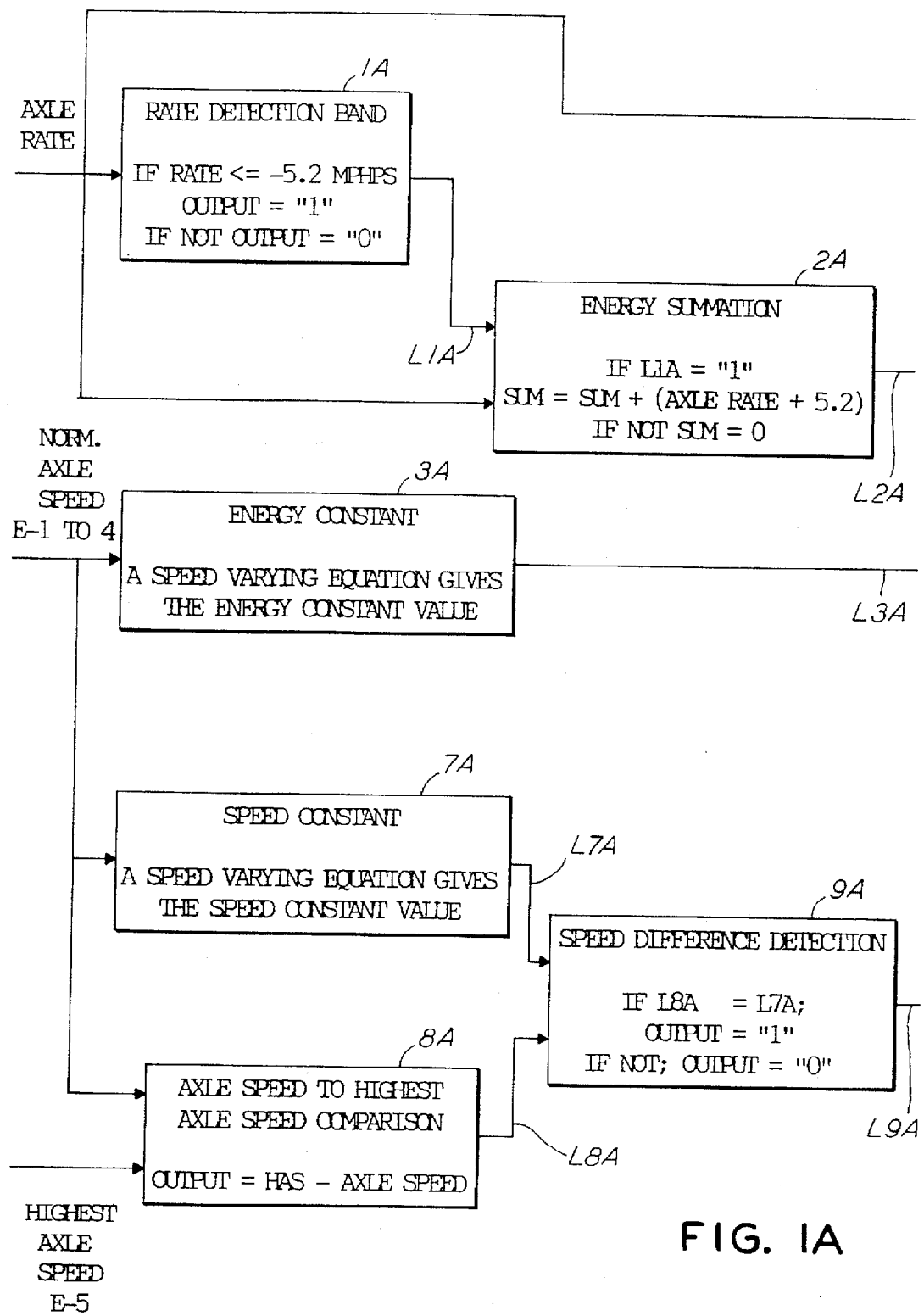
FIG. IA

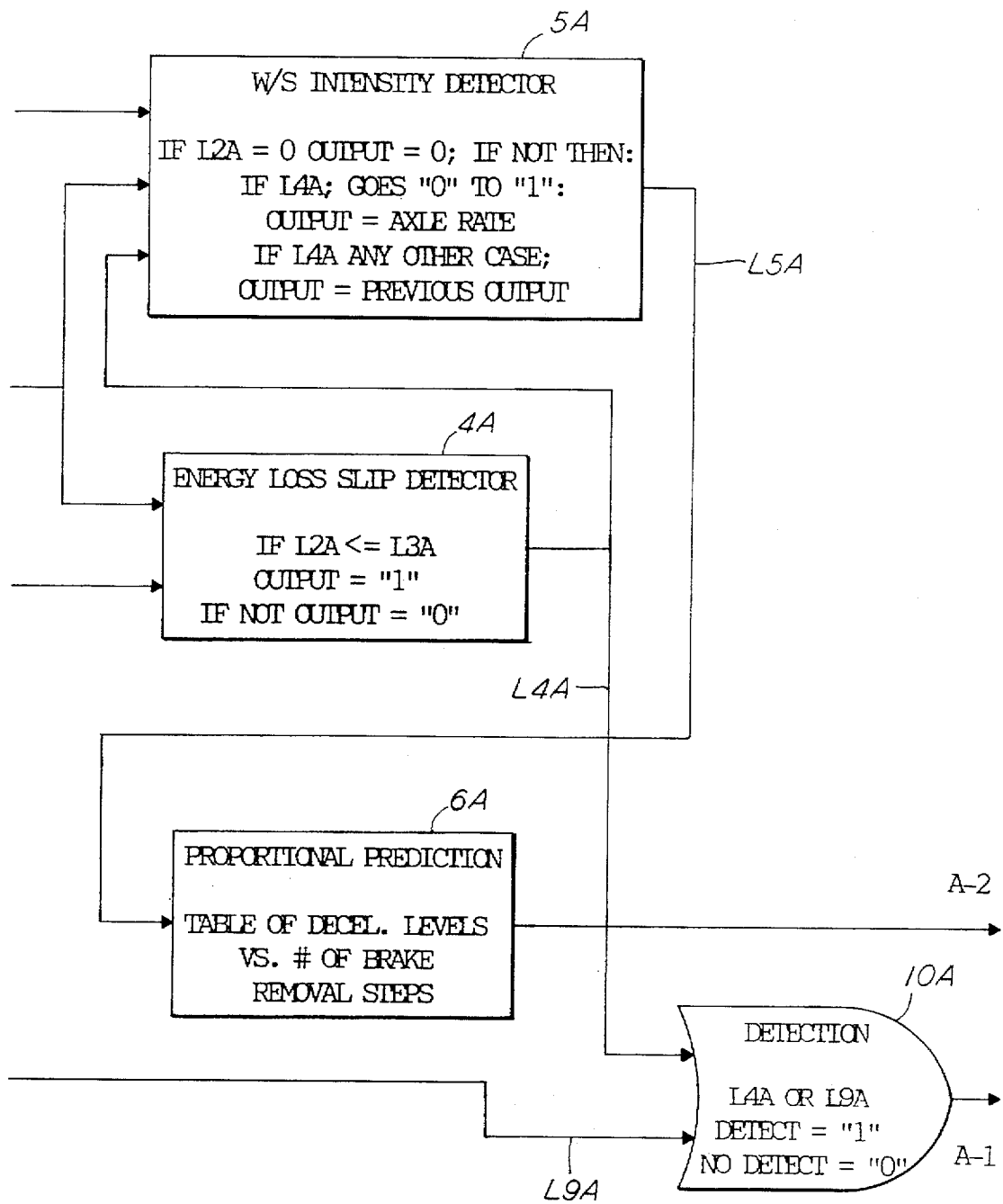
FIG. IB

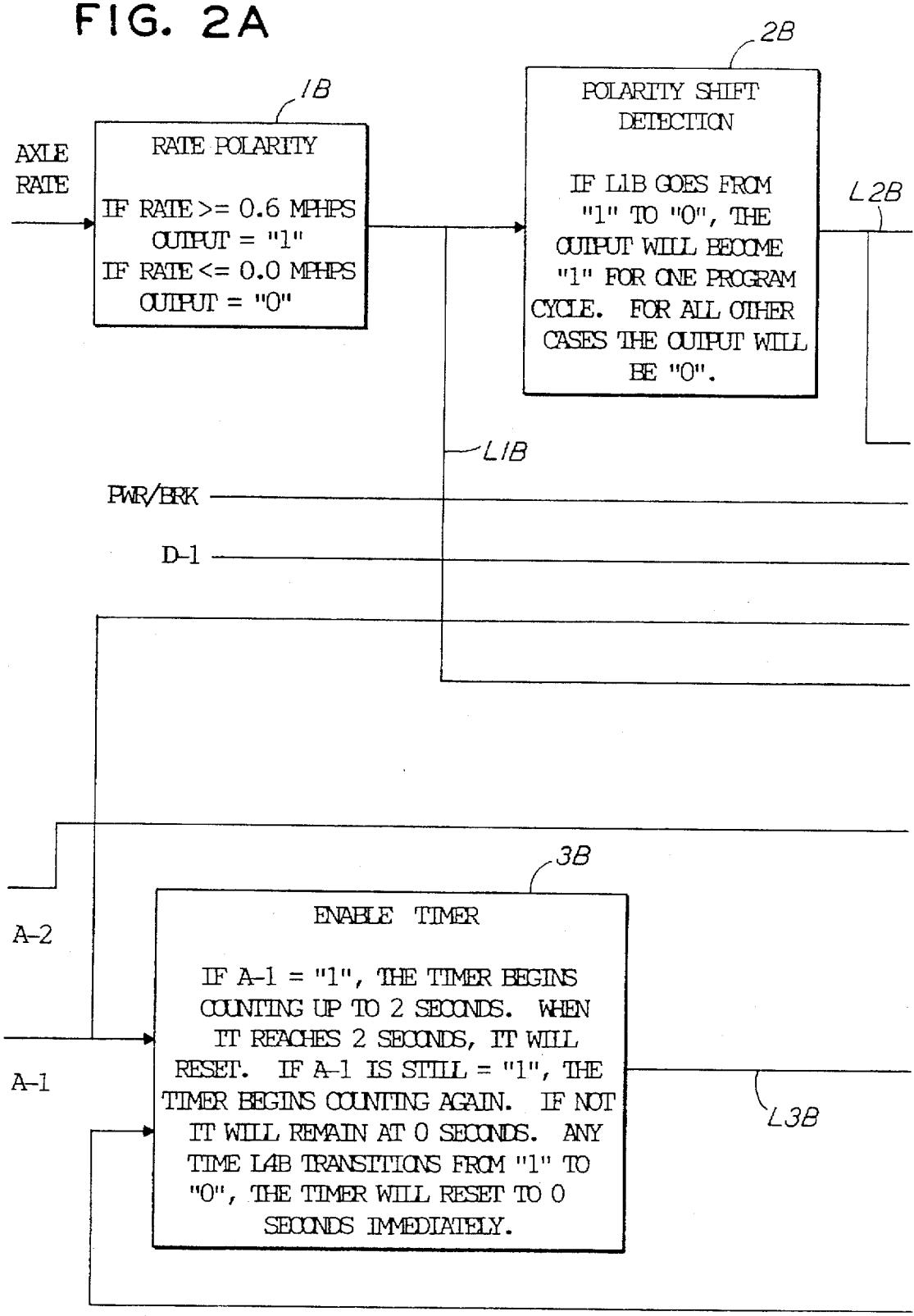

REQUIRED BCP TR #1 ─────────────────────
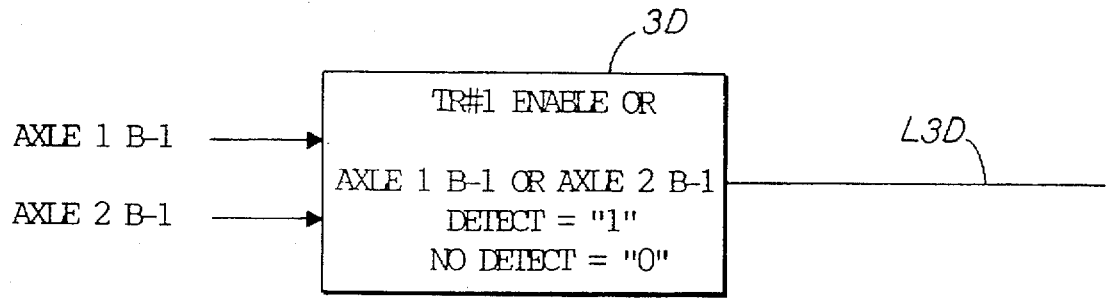
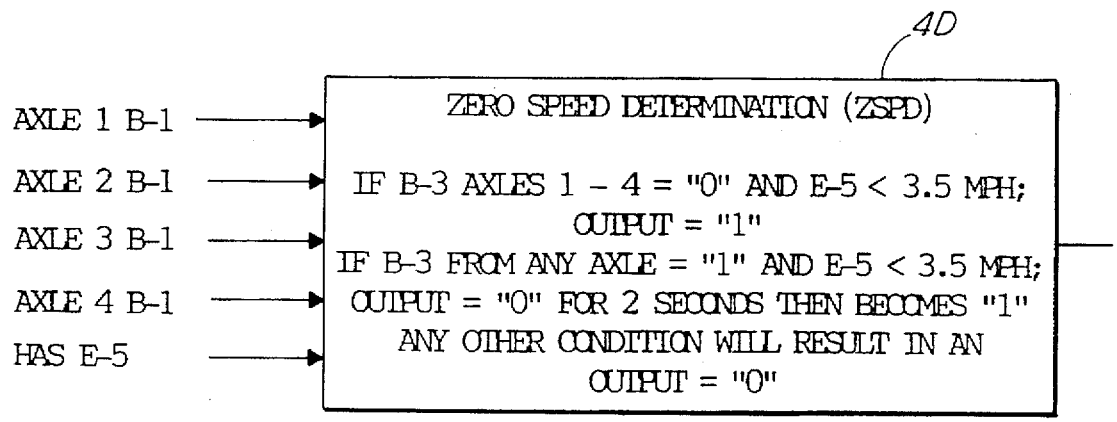
REQUIRED BCP TR #2 ─────────────────────
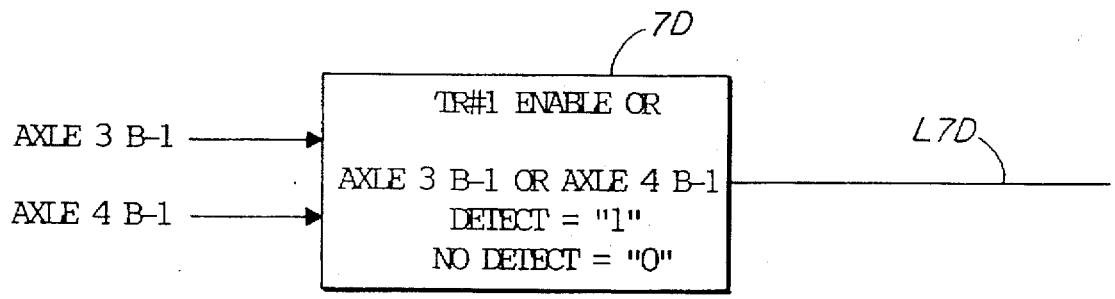
FIG. 4A

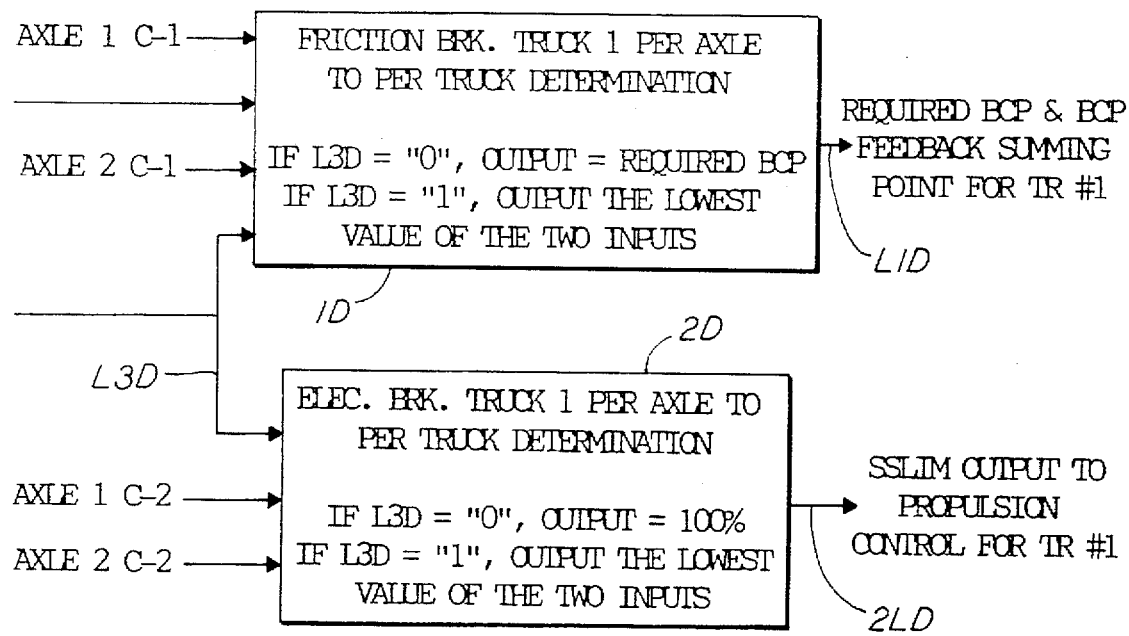
FIG. 4B
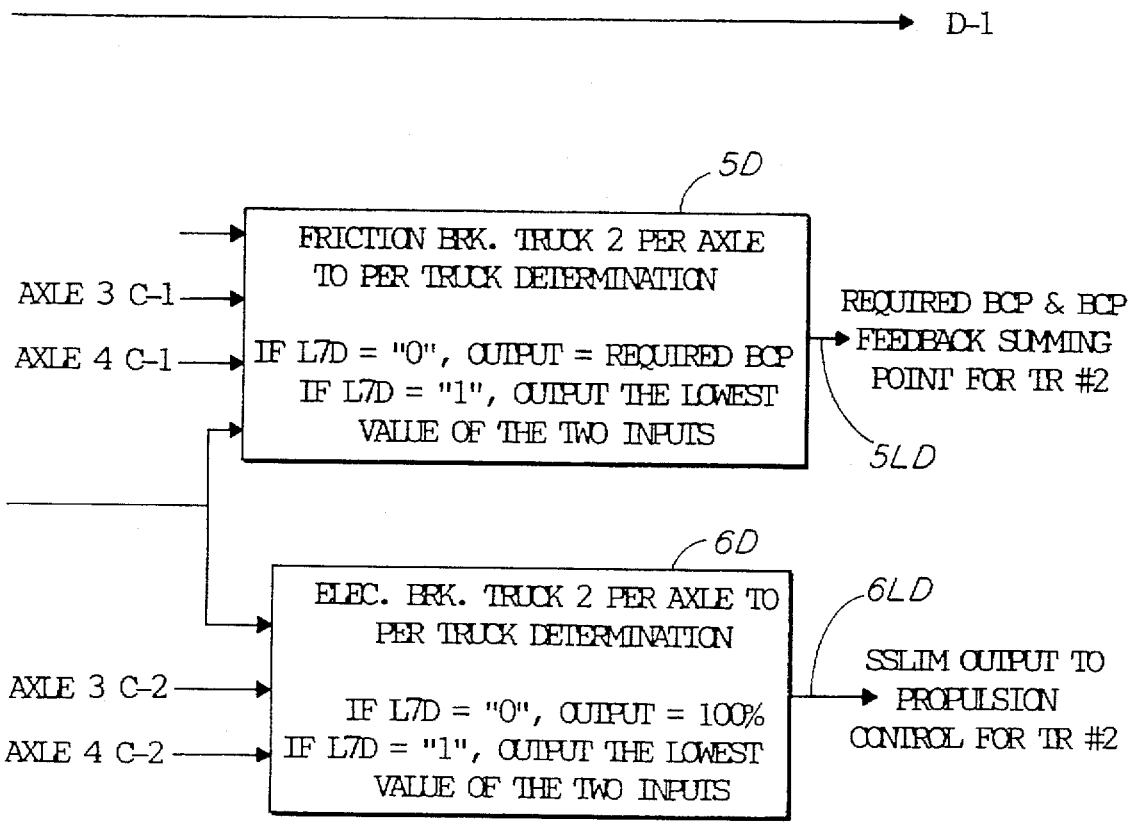

5,752,212

PROPORTIONAL POLARITY SHIFT WHEEL SLIDE PROTECTION

FIELD OF THE INVENTION

This invention applies to railway braking systems, and more particularly, applies to passenger transit type, or similar railway vehicles and has as its purpose the modulation of brake application forces to prevent wheel slide and wheel lockup.

BACKGROUND OF THE INVENTION

A variety of systems have been developed to control wheel slide and wheel lockup during braking. Some of these are adaptive to the adhesion between the wheels and the rails. They determine the severity of a slide condition at the onset of a slide, and make a brake force reduction based on that determination. These have the disadvantage that if adhesion changes during a slide, the brake force reduction may not be optimum.

Presently most complex logic adhesion adaptive slide control processes use three state (release, hold, & apply) friction brake control, and simply remove dynamic braking until the low adhesion situation clears. Additionally, there are some simple logic non-adaptive slide control systems which control both the dynamic and friction braking, digitally and in parallel. These systems generally require additional pneumatic equipment, such as dump valves, to reduce the pneumatic brake application forces during a wheel slide event. In some of these systems, friction brakes are applied and released in rapid succession, so that the wheel experiences an averaged, reduced braking force.

Most prior systems for the prevention of wheel slide and lock-up during braking operations are separate from the vehicle's braking system. In most prior systems, the wheel slide function is in a unit separate from the vehicle's braking system.

A prior system which uses data from all the axles on the railway vehicle to determine wheel slide is presented in U.S. Pat. No. 4,071,282, issued Jan. 31, 1978 and entitled SLIP-SLIDE DETECTOR SYSTEM FOR RAILWAY CAR WHEELS. Although this system uses data from all the axles, it does not compensate for different wheel diameters, which may be caused by wear of the wheels.

A prior art method of detecting wheel slip and determining the severity of wheel slip is presented U.S. Pat. No. 5,471,387 which is entitled A METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM This patent was filed on Apr. 18, 1994, and assigned to the assignee of the present invention. This invention forms a part of the present invention.

A prior art method of determining that wheel slide has been corrected is presented in RATE POLARITY SHIFT WHEEL-SLIP CONTROL SYSTEM, which is U.S. Pat. No. 4,491,920. This was issued on Jan. 1, 1985, and assigned to the assignee of the present invention. This invention determines that a wheel slide condition has been corrected when the acceleration rate of an axle which is sliding and being corrected makes a transition from a positive to a negative acceleration rate. The case which is detected here is that of a wheel which has been sliding, and for which braking force has been reduced. Reduction of the braking force allows the axle to accelerate to approach the speed of the train, so its acceleration rate is positive. When it reaches the speed of the train, then its acceleration becomes negative because the train, due to the braking, has a negative acceleration. At that time, since the sliding has been corrected, the braking force on the axle is reapplied. This invention also forms a part of the present invention. The teachings of U.S. Pat. No. 5,471,387 and U.S. Pat. No. 4,491,920 are incorporated herein by reference thereto.

SUMMARY OF INVENTION

This invention provides an apparatus for wheel slip control on a passenger transit type railway vehicle. Apparatus is provided for receiving signals representing the speeds and acceleration rates of the axles of the vehicle, and generating signals which indicate, for each of the axles, whether or not the wheels are slipping. The apparatus also generates signals indicating the severity of wheel slip. From this, the apparatus makes a first estimate of the optimum braking force, and applies it to the axle. It also starts a timer, which determines the time that wheel slip has been in effect, and based on this time, provides signals for additional brake reduction.

In a further aspect, this invention provides a method for wheel slip control on a passenger transit type railway vehicle. The method involves receiving signals representing the speeds and acceleration rates of the axles of the vehicle, and generating signals which indicate, for each of the axles, whether or not the wheels are slipping. The method also includes generating signals indicating the severity of wheel slip, and from these, making first estimates of the optimum braking reduction, and applying these to the axle. The method also includes starting a timer, and determining the time that wheel slip has been in effect, and based on this time, providing signals for additional brake reduction.

OBJECTS OF THE INVENTION

It is an object of this invention to provide an improved wheel slip control system for modulating brakes on a passenger transit type railway vehicle having a plurality of axles on which wheels are mounted.

One particular object is to provide a system which is adhesion adaptive. The system provides an improved response to a skid by first determining the severity of the skid and making a first brake reduction. Then, during the time that the skid continues, the system times the skid, and reduces the brake application forces further for skids which are not quickly corrected.

A related object is to provide a system which makes less conservative braking reductions than are required in prior art systems. Since the system determines the time that a skid is in effect, increasing the brake reduction accordingly, it is not necessary for the initial brake reduction to be as large as is needed as on non-adaptive skid control systems. Hence, the system of the present invention provides stronger braking, even in the event of wheel skid than non-adaptive skid control systems.

A further object is to provide a system for wheel slip control which provides proportional brake reduction signals which are equal for both the friction and the dynamic brakes.

A further object is to provide a wheel slip control system which is integrated with the vehicle's braking system. External dump valves for reducing brake air pressure are eliminated and their function is taken over by the dump valves of the pneumatic brake control system itself.

A further object is to provide wheel slip sensing which uses wheel speed data, normalized to compensate for different wheel diameters, from all the axles on a car. Any axle, which has a normalized speed equal to the highest normalized axle speed, is considered not to be slipping.

In another aspect, an object of the invention is to provide a method for wheel slip correction which adapts to the severity of the skid by timing the duration of the skid and reducing the brake application forces progressively if the skid continues. A related object is to make a less conservative brake reduction at the beginning of a skid, because of the ability to reduce the brake application forces further if the skid continues.

Another object of the invention is to provide a method for providing equal proportional brake reduction signals to both the friction brakes and dynamic brakes. By this method, it is possible to include the wheel skid prevention system with the braking system, eliminating some external equipment such as dump valves for the pneumatic system.

Another object of the invention is to provide a method for compensating for variations in wheel diameter, which may be caused by wear of the wheels. The method involves measuring the axle speeds of all the axles on the vehicle during a time when it is known that wheel slip is not occurring, generating signals representing normalization factors which depend on wheel diameter, and then, during a skid, using the normalized axle speeds to only generate a signal indicative of skidding for an axle having a normalized axle speed less than the highest axle speed.

Additional objects and advantages of the invention will become apparent to one skilled in the art, based on this specification, and the claims.

BRIEF DESCRIPTION OF THE DRAWINGS

FIGS. 1A and 1B are a block diagram of the PPS Wheel Slip Detection, Module A of the system. This module is provided for each individual axle of the railway vehicle. Note: this module contains the speed varying energy level wheel slip detection process which is pending patent application Ser. NO. 08/228,660, as mentioned previously. Also please note: the abbreviation PPS refers to Proportional Polarity Shift.

FIG. 2A and 2B are a block diagram of the PPS Wheel Slip Correction and Polarity, Module B of the system. This module is provided for each individual axle of the railway vehicle. Note: this module contains the "Rate Polarity Wheel Shift Wheel-Slip Control System", U.S. Pat. No. 4,491,920, as mentioned previously.

FIG. 4A and 4B are a block diagram of the PPS Force Modulation Commands and Zero Speed. One such module is provided for the railway vehicle.

BRIEF DESCRIPTION OF INVENTION AND PRESENTLY-PREFERRED EMBODIMENT

FIGS. 1A–1B through 5A–5B are block diagrams which define the control functions of the invention. These functions may be accomplished by separate modules connected as shown, or they may be incorporated into a microprocessor. In the latter case, the functions of the blocks in these figures are accomplished by lines of code, and the conveyance of information from one block to another is accomplished by one block writing data to the processor's memory, and another block accessing that data from memory.

Figure 2B:
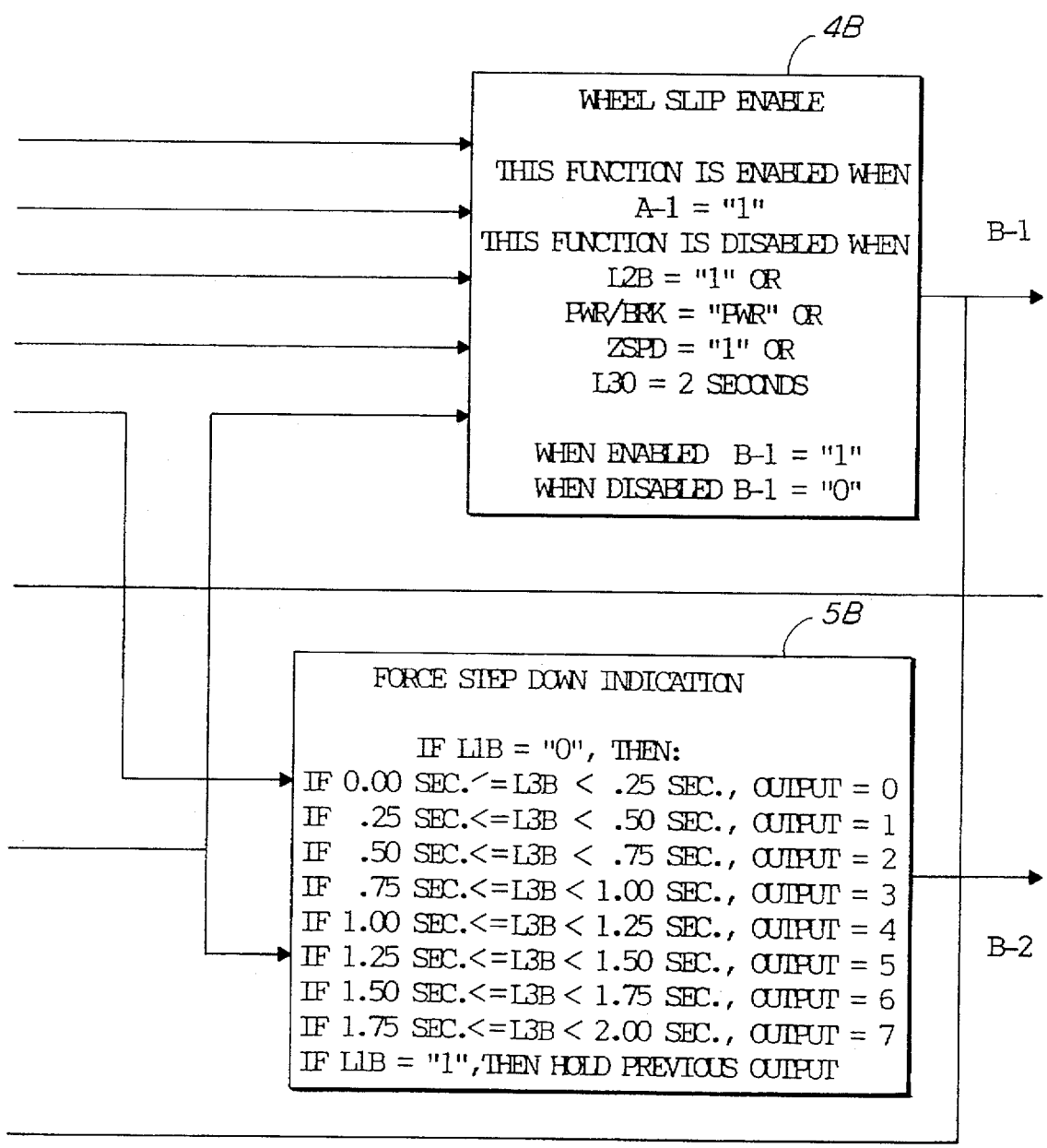
Figure 3A:
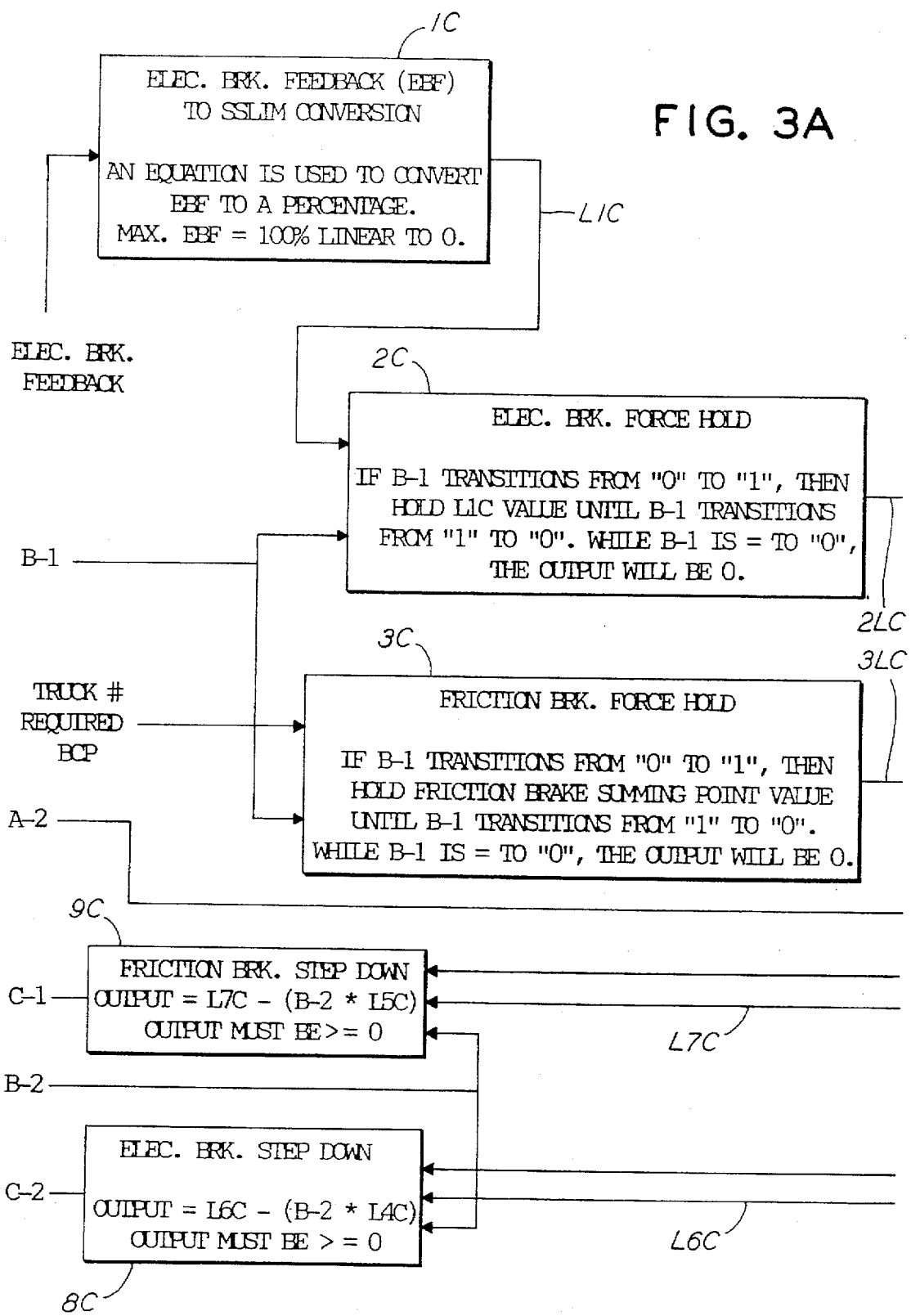
FIG. 3A and 3B are a block diagram of the PPS Force Modulation, Module C of the system. This module is provided for each individual axle of the railway vehicle.
Figure 3B:
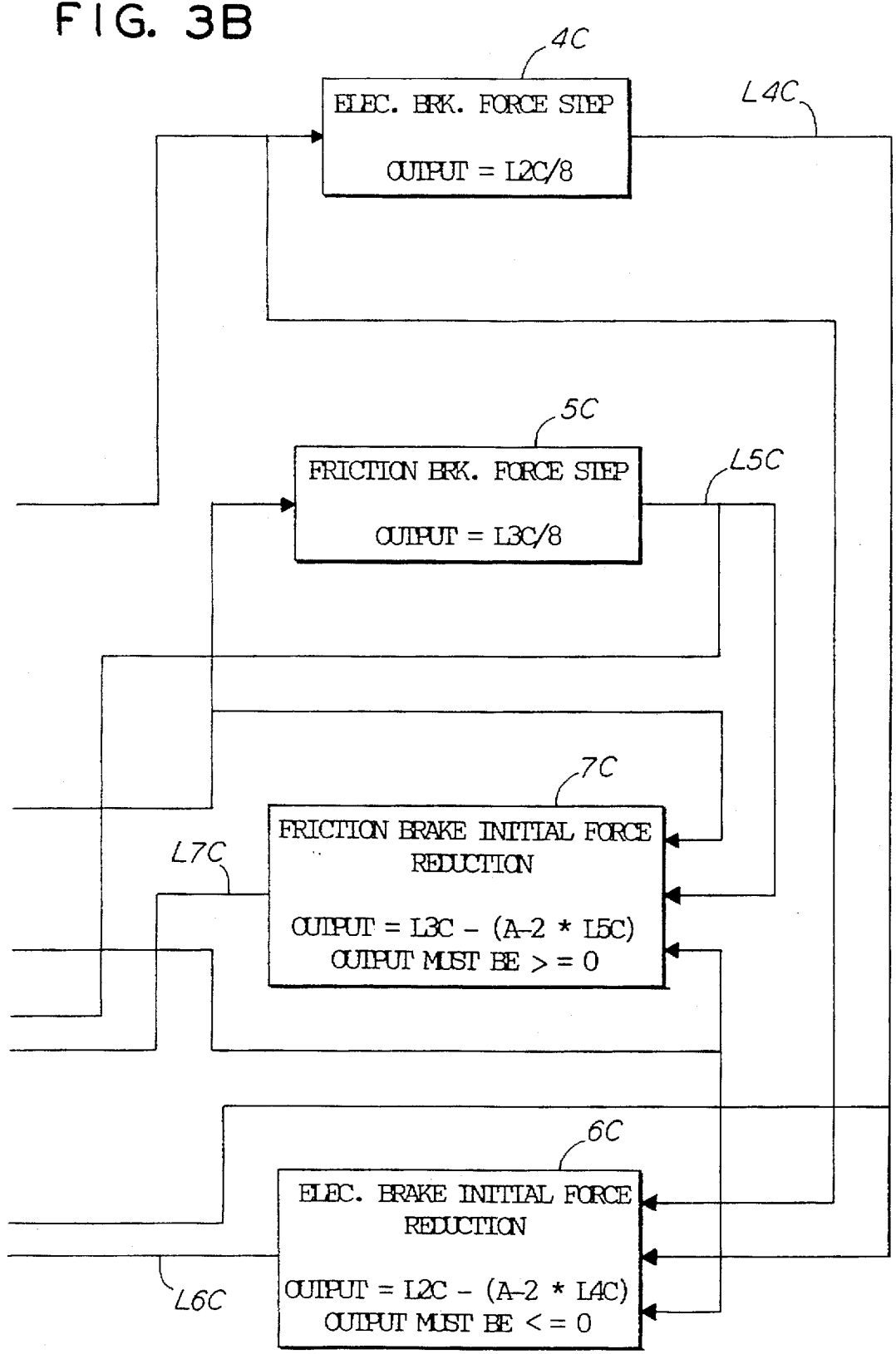
Figure 5A:
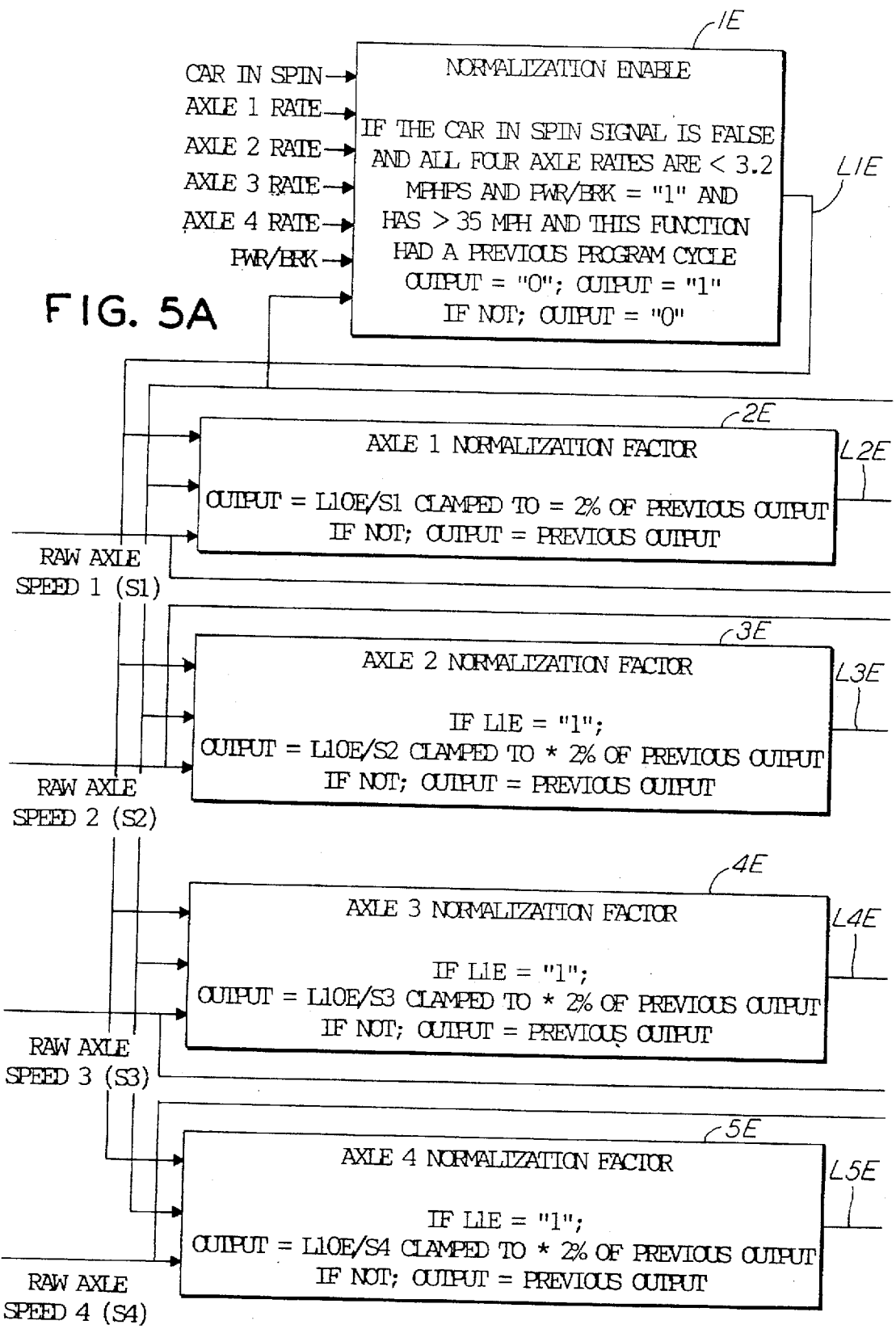
FIG. 5A and 5B are a block diagram of the PPS Highest Axle Speed and Speed Normalization. One such module is provided for the railway vehicle.
Figure 5B:
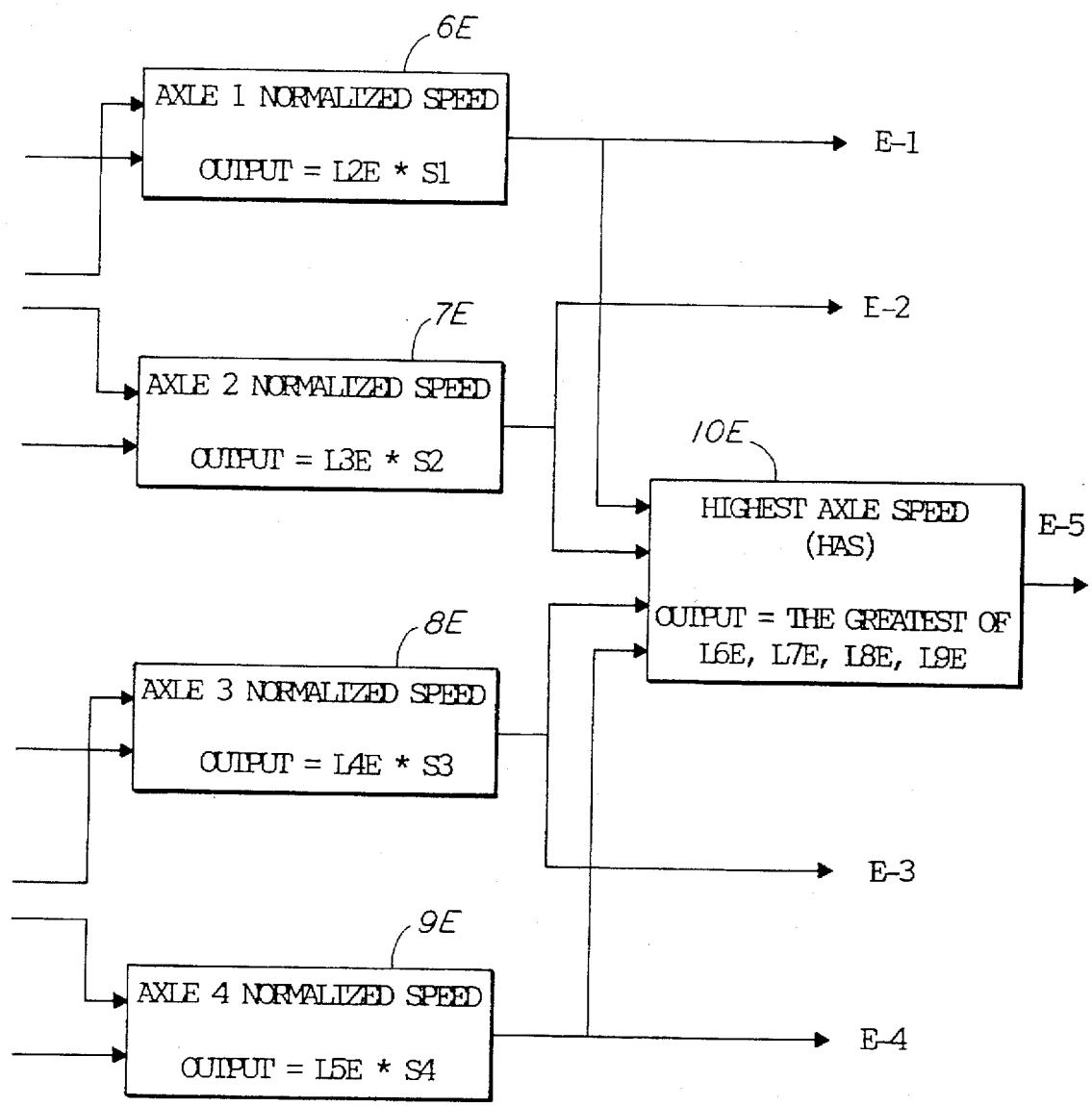

Modules A, B, and C, shown in FIGS. 1, 2, and 3 are duplicated as many times as there are axles on the railway vehicle. For the case of a microprocessor-controlled system, each logical or numeric quantity in these figures has as many storage locations as there are axles, one storage location being used for data from the corresponding axle.

This invention provides a wheel slip control system for modulating brakes on a passenger transit type railway vehicle having a plurality of axles on which wheels are mounted, this wheel slip control system having the following components: apparatus for receiving signals indicating the speeds of the axles. These are 2E, 3E, 4E, and 5E in FIG. 5. The system also has apparatus for receiving signals indicating the acceleration rates of the axles and for generating signals indicating whether the wheels are slipping, and the severity of the wheel slip. These are 1A, 2A, 4A and 5A in FIG. 1. The system also has apparatus for generating a first signal for brake reduction, 6A in FIG. 1. The system also has timing apparatus, 3B in FIG. 2 which responds to the signals indicating whether the wheels are slipping to generate signals indicating the time that a wheel slip condition has been in effect. The system also has apparatus responding to the signals indicating the time that a wheel slip condition has been in effect for generating a second signal for brake reduction, 5B in FIG. 2. The system also has apparatus, 8C and 9C in FIG. 3 responding to the first signal for brake reduction and the second signal for brake reduction to reduce the application forces of the brakes.

The presently-preferred embodiment of the invention is adapted to a railway vehicle having two trucks and two axles per truck.

A self-propelled subway vehicle with AC motors and per truck dynamic and friction braking control will be used as an example. This particular embodiment applies to a railway vehicle having two trucks, with two axles in each truck for a total of four axles.

This example assumes microprocessor control with a 20 millisecond program cycle. It should be noted that anyone skilled in the art could apply this approach to other steel wheel to steel rail vehicle applications.

PROCESS INPUT SIGNALS:

AXLE RATE (four; one/axle)—This signal is the acceleration/deceleration rate of the wheel/axle set which is being monitored for slippage. It is developed from the differentiation of the speed signal which is externally supplied to the unit using this process by an outside source (i.e., speed pickup). Note: this process is to be used individually for each wheel/axle set to be monitored.

RAW AXLE SPEED (four; one/axle)—This signal is the speed of the wheel/axle set which is being monitored for slippage. It is provided by an externally supplied signal (i.e., speed pickup) to the unit using this process.

ELECTRIC BRAKE FEEDBACK (two; one/truck)—This signal gives the dynamic brake force output on the respective truck.

TRUCK REQUIRED BCP (two; one/truck)—This signal gives the brake cylinder pressure value being commanded on the respected truck.

PWR/BRK (one; one/car)—This signal indicates whether the car is in power ("1") or in brake ("0").

CAR IN SPIN (one; one/car)—This signal indicates if any of the vehicles axles are in a spin condition.

PROCESS OUTPUT SIGNALS:

REQUIRED BCP & BCP FEEDBACK SUMMING POINT (two; one/truck)—This is the wheel slide control modified friction brake command, which is sent to the brake cylinder pressure feedback point of the respective truck brake control logic.

SSLIM OUTPUT TO PROPULSION CONTROL (two; one/truck)—This is the wheel slide control modified dynamic brake command signal sent to the propulsion control of the respective truck.

PPS WHEEL SLIP DETECTION—MODULE A (FIG. 1)
Note; the function of the module will be performed for each individual axle on the vehicle. (Note; this module contains the speed varying energy level wheel slip detection process which is a pending patent application Ser. No. 08/228,660, as mentioned previously.)

RATE DETECTION BAND 1A
INPUTS:

AXLE RATE—This signal is the acceleration/deceleration rate of the wheel/axle set which is being monitored for slippage. It is developed from the differentiation of the speed signal which is externally supplied to the unit using this process by an outside source (i.e., speed pickup).

PROCESS:

The input is compared to a deceleration rate level. This level is set to be indicative of the border line between a deceleration rate that the vehicle could actually produce without wheel slippage and any deceleration rate that is in the wheel slippage range.

OUTPUT: (On L1A)

If the axle rate is less than or equal to −5.2 MPHPS the output from this function will be logical "1". If the input from the axle rate is greater than −5.2 MPHPS the output from this function will be logical "0".

ENERGY SUMMATION 2A
INPUTS:

AXLE RATE—This signal is the acceleration/deceleration rate of the wheel/axle set which is being monitored for slippage. It is developed from the differentiation of the speed signal which is externally supplied to the unit using this process by an outside source (i.e., speed pickup).

RATE DETECTION BAND—This signal is the output of function 1A. A logical "1" indicated the axle rate is below the detection value, while a logical "0" indicates it is not.

PROCESS:

This function computes a value proportional to the energy lost by the axle while it has been in the wheel slip range. (Note; the value computed will be negative and the more negative the value is implies more energy has been lost.)

OUTPUT: (On L2A)

If the input from 1A is equal to a logical "1", then this function will perform the following summation:
SUM=Previous SUM+(Axle Rate Input+5.2 MPHPS)

If the input from 1A is equal to a logical "0", then this function will set the summation equal to a value of 0.

ENERGY CONSTANT 3A
INPUTS:

NORMALIZED AXLE SPEED—This signal is output E-1 for Axle 1, E-2 for Axle 2, E-3 for Axle 3, or E-4 for Axle 4 from Module E. This signal is the respective axles normalized speed signal.

PROCESS:

This function computes an axle speed varying constant, which is used to determine the energy level where a slip will be detected.

OUTPUT:

The output of this function is determined by an equation based on an input from the respective axles normalized speed. (With respect to the axle, this input may come from E-1, E-2, E-3, or E-4). The input versus output equation for this function for the specific example cited here is presented as follows: Output=8+(Normalized Axle Speed/8)

ENERGY LOSS SLIP DETECTOR 4A
INPUTS:

ENERGY SUMMATION—This signal is the output of function 2A This signal is a negative summation value of the axle rate below −5.2 MPHPS from the point were the axle rate went into the slippage range. If this signal is 0, the axle rate is out of the detection possibility band.

ENERGY CONSTANT—This signal is the output of function 3A. This signal is an axle speed varying comparison value for the Energy Summation Value.

PROCESS:

This function compares the energy summation to the energy constant, to make the actual energy level slip detection indication.

OUTPUT:

If the input from 2A is less than or equal to the input from 3A, then the output from this function will be a logical "1". If the input from 2A is greater than the input from 3A, then the output from this function will be a logical "0".

WHEEL SLIP INTENSITY DETECTOR 5A
INPUTS:

AXLE RATE—This signal is the acceleration/deceleration rate of the wheel/axle set which is being monitored for slippage. It is developed from the differentiation of the speed signal which is externally supplied to the unit using this process by an outside source (i.e., speed pickup).

ENERGY SUMMATION—This signal is the output of function 2A. This signal is a negative summation value of the axle rate below −5.2 MPHPS from the point were the axle rate went into the slippage range. If this signal is 0, the axle rate is out of the detection possibility band.

ENERGY LOSS SLIP DETECTOR—This signal is the output of function 4A. A logical "1" indicates that a slip on the respective axle has been detected, while a logical "0" indicates that the Energy Loss Slip Detector has not detected a slip on the respective axle.

PROCESS:

This function is used to capture the deceleration rate at the time an energy level slip detection is made. This gives an indication of how intense the slip is and holds the indication until the axle rate is above the detection range.

OUTPUT:

If the input from 2A is equal to zero, then the output of this function will be zero. If the input from 2A is less than zero AND if the input from 4A transitions from a logical "0" to a logical "1", then the output of this function will be the respective axle rate. Any other case than the two previously identified in this paragraph will result in an output from this function equal to the output from this function from the previous program cycle.

PROPORTIONAL PREDICTION 6A

INPUTS:

WHEEL SLIP (W/S) INTENSITY DETECTOR—This signal is the output of function 5A. This signal is either the respective axles deceleration rate at the time the most recent slip was detected or a value of 0.

PROCESS:

This function is used to predict the initial proportion of braking force to be removed at detection based on the axle deceleration rate at the point of the energy loss slip detection. Note; if a speed difference detection occurs first, this function will still give an output, but that output will not become fixed until an energy loss slip detection occurs.

OUTPUT:

The output of this function is determined by a look up table based on an input from 5A. The output of this function is sent to other modules and is called A-2. The input versus output table for this function is presented as follows:

| W/S INTENSITY LEVEL | NUMBER OF BRAKE REMOVAL STEPS |
| --- | --- |
| <= –16 MPHPS | 6 |
| <= –14 MPHPS to > –16 MPHPS | 5 |
| <= –12 MPHPS to > –14 MPHPS | 4 |
| <= –10 MPHPS to > –12 MPHPS | 3 |
| <= –8 MPHPS to > –10 MPHPS | 2 |
| > –8 MPHPS | 1 |

SPEED CONSTANT 7A

INPUTS:

NORMALIZED AXLE SPEED—This signal is output E-1 for Axle 1, E-2 for Axle 2, E-3 for Axle 3, or E-4 for Axle 4 from Module E. This signal is the respective axles normalized speed signal.

PROCESS:

This function provides a speed varying value which is used to compare with the axle speed difference.

OUTPUT:

The output of this function is determined by an equation based on an input from the respective axles normalized speed. (with respect to the axle this input may come from E-1, E-2, E-3, or E-4 of Module E.) The input versus output equation for this function is presented as follows:

Output=2+(Normalized Axle Speed/16)

AXLE SPEED TO HIGHEST AXLE SPEED COMPARISON 8A

INPUTS:

NORMALIZED AXLE SPEED—This signal is output E-1 for Axle 1, E-2 for Axle 2, E-3 for Axle 3, or E-4 for Axle 4 from Module E. This signal is the respective axles normalized speed signal.

HIGHEST AXLE SPEED (HAS)—This signal is output E-5 from Module E. This signal is the highest axle speed signal of the four.

PROCESS:

This function is used to calculate the difference between the highest axle speed on the vehicle and the respective axle.

OUTPUT:

The output of this function is equal to the respective axles normalized speed (With respect to the axle this input may come from E-1, E-2, E-3, or E-4 of Module E.) subtracted from the HAS (The Highest Axle Speed input from E-5 of Module E). The output of this function is sent to other modules and is called A-3.

SPEED DIFFERENCE DETECTION 9A

INPUTS:

SPEED CONSTANT—This signal is the output of function 7A this signal is an axle speed varying comparison value for the Axle Speed To Highest Axle Speed Comparison Value.

AXLE SPEED TO HIGHEST AXLE SPEED COMPARISON—This signal is the output of function A.08. This signal, is a value of the speed difference between the respective axle and the highest speed axle on the vehicle.

PROCESS:

This function compares the speed varying constant with the respective axles speed difference. Axle speed differences greater than the speed varying constant are considered a speed difference wheel slip detection.

OUTPUT:

If the input from 8A is greater than or equal to the input from 7A, then the output of this function will be a logical "1". If the input from 8A is less than the input from 7A, then the output of this function will be a logical "0".

DETECTION 10A

INPUTS:

ENERGY LOSS SLIP DETECTOR—This signal is the output of function 4A. A logical "1" indicates that a slip on the respective axle has been detected, while a logical "0" indicates that the Energy Loss Slip Detector has not detected a slip on the respective axle.

SPEED DIFFERENCE DETECTION—This signal is the output of function 9A. A logical "1" indicates that a slip on the respective axle has been detected, while a logical "0" indicates that the Speed Difference Detector has not detected a slip on the respective axle.

PROCESS:

This function is a logical "OR" function. This function OR's the Energy Loss Wheel Slip Detection with the Speed Difference Wheel Slip Detection, producing the respective axle's wheel slip detection signal.

OUTPUT:

If the input from 4A is equal to a logical "1" OR the input from 9A is equal to a logical "1", then the output of this function will equal a logical "1". If the input from 4A is equal to a logical "0" AND the input from 9A is equal to a logical "0", then the output of this function will equal a logical "0".

PPS WHEEL SLIP CORRECTION & POLARITY—MODULE B (FIG. 2)

Note; the function of this module will be performed for each individual axle on the vehicle. (Note; this module contains the "Rate Polarity Shift Wheel-Slip Control System" U.S. Pat. No. 4,491,920.)

RATE POLARITY 1B

INPUTS:

AXLE RATE—This signal is the acceleration/deceleration rate of the wheel/axle set which is being monitored for slippage. It is developed from the differentiation of the speed signal which is externally supplied to the unit using this process by an outside source (i.e., speed pickup).

PROCESS:

This function determines if the axle rate is positive or negative in polarity. This function has a small hysteresis band and does not necessarily transition at a 0 axle rate.

OUTPUT:

If the input from the respective axle rate becomes greater than or equal to 0.6 MPHPS, then the output of this function will become a logical "1". IF the input from the respective axles rate becomes less than or equal to 0.0 MPHPS, the output of this function will become a logical "0".

POLARITY SHIFT DETECTION 2B

INPUTS:

RATE POLARITY—This signal is the output of function 1B. A logical "1" indicated the axle rate is in the positive range, while a logical "0" indicates it is not.

PROCESS:

This function is used to signal the fact that the axle rate has transitioned from positive to negative. This is the primary indication that a wheel slip correction has been completed.

OUTPUT:

If the input from 1B transitions from a logical "1" to a logical "0", then the output of this function will become a logical "1" for one program cycle. For all other input conditions, the output from this function will remain a logical "0".

ENABLE TIMER 3B

INPUTS:

DETECTION—This signal is the output A-1 from Module A of the respective axle. This signal is a logical "1" when the respective axles' detection logic, in Module A, has detected a potential slide. This signal is a logical "0" under normal operational conditions.

WHEEL SLIP ENABLE—This signal is the output of 4B. This signal is a logical "1", when the respective axle is working on correction of a slide ("enabled"). This signal is a logical "0" under normal non-sliding condition ("disabled").

PROCESS:

This function is used to time how long the slide control on a respective axle has been enabled. It also is used to put a maximum time limit on the amount of time an axle can stay enabled.

OUTPUT:

If A-1 is equal to a logical "1", the timer begins counting up to 2.0 Seconds. When the timer reaches 2.0 Seconds, the timer will reset. If A-1 is still equal to "1", the timer will begin counting again, if not it will remain at 0.0 Seconds. Any time the input from 4B transitions from a logical "1" to a logical "0", the timer will reset to 0.0 Seconds immediately.

WHEEL SLIP ENABLE 4B

INPUTS:

POLARITY SHIFT DETECTION—This signal is the output of function 2B. When the respective axles rate has shifted from a positive polarity to a negative polarity this signal will be a logical "1" for one program cycle. This signal will be a logical "0" for all other conditions.

POWER/BRAKE (PWR/BRK)—This signal indicates whether the car is in power ("1") or in brake ("0").

ENABLE TIMER—This signal is the output of function 3B. When a slip is detected this function will begin counting to 2.0 Seconds. When reset this function will remain at 0.0 Seconds until a slip is detected again.

ZERO SPEED DETERMINATION (ZSPD)—This signal is the output D-1 from Module D. This signal is a logical "1" when the vehicle is not moving or moving at an almost imperceptible speed. This signal is a logical "0" when the vehicle is moving.

DETECTION—This signal is the output A-1 from Module A of the respective axle. This signal is a logical "1" when the respective axles' detection logic, in Module A, has detected a potential slide. This signal is a logical "0" under normal operational conditions.

PROCESS:

This function performs one important task. It is to indicate to the logic that a slip correction is or is not in process on the respective axle.

OUTPUT:

This function will become "Enabled" when the input from A-1 of Module A is equal to a logical "1". This function will remain "Enabled" until one of the following occurrences "Disables" it:

If the input from 2B is equal to a logical "1", then this function is "Disabled".

If the input from PWR/BRK is equal to a logical "1", then this function is "Disabled".

If the input D-1 from Module D is equal to a logical "1", then this function is "Disabled".

If the input from 3B is equal to 2.0 Seconds, then this function is "Disabled".

When this function is "Disabled", output B-1 will be equal to a logical "0". When this function is "Enabled", output B-1 will be equal to a logical "1". The output B-2 is sent out to other modules.

FORCE STEP DOWN INDICATION 5B

INPUTS:

RATE POLARITY—This signal is the output of function 1B. A logical "1" indicated the axle rate is in the positive range, while a logical "0" indicates it is not.

ENABLE TIMER—This signal is the output of function 3B. When a slip is detected this function will begin counting to 2.0 Seconds. When reset this function will remain at 0.0 Seconds until a slip is detected again.

PROCESS:

This function is used if greater force reduction is needed to effect a slide correction. If the axle slide correction is enabled and the axle rate has not become positive, the axle has not begun to correct the slide. As time increases and this condition persists, this function will request that more braking force be removed in proportional steps.

OUTPUT:

The output of this function is determined by inputs from 1B and 3B. If the input from 1B is equal to a logical "0", the output of this function is determined by a table. The input versus output table for this function is presented as follows:

| INPUT FROM ENABLE TIMER | | NUMBER OF BRAKE REMOVAL STEPS |
|---|---|---|
| 0 Sec. <= 3B | <.25 Sec. | 0 |
| .25 Sec. <= 3B | <.5 Sec. | 1 |
| .5 Sec. <= 3B | <.75 Sec. | 2 |
| .75 Sec. <= 3B | <1 Sec. | 3 |
| 1 Sec. <= 3B | <1.25 Sec. | 4 |
| 1.25 Sec. <= 3B | <1.5 Sec. | 5 |
| 1.5 Sec. <= 3B | <1.75 Sec. | 6 |
| 1.75 Sec. <= 3B | <2 Sec. | 7 |

If the input from 1B 1 is equal to a logical "1", the output from this function is equal to the output provided by this function during the last program cycle. The output of this function is sent to other modules and is called B-2.

PPS FORCE MODULATION—MODULE C (FIG. 3)

Note: the function of this module will be performed for each individual axle on the vehicle.

ELECTRIC BRAKE FEED BACK TO SSLIM CONVERSION 1C

INPUTS:

ELECTRIC BRAKE FEEDBACK—This signal give the dynamic brake force output on the respective truck for this axle.

PROCESS:

This function converts the electric brake feedback signal to a percentage such as used by the SSLIM signal which is used to reduce dynamic braking force.

OUTPUT:

Output=0.04%VDC*(Electric Brake Feedback VDC−0.5 VDC)

(All EBF<0.5 VDC Will=0.5 VDC & All EBF>4.5 VDC Will=4.5 VDC)

ELECTRIC BRAKE FORCE HOLD 2C

INPUTS:

ELECTRIC BRAKE FEEDBACK TO SSLIM CONVERSION—This signal gives the dynamic brake in terms of 0 to 100% of its maximum possible value.

WHEEL SLIP ENABLE—This signal is the output B-1 from Module B.

This signal is a logical "1", when the respective axle is working on correction of a slide ("enabled"). This signal is a logical "0" under normal non-sliding condition ("disabled").

PROCESS:

This function is used to hold the respective truck's dynamic brake force level in effect at the time the axle's slide control is enabled. This becomes the basis for the proportional force reduction throughout each particular axle slide correction.

OUTPUT:

When the input from B-1 transitions from a logical "0" to a logical "1", this function will hold the value from 1C as its output until B-1 transitions from a logical "1" to a logical "0". While B-1 is equal to a logical "0", the output of this function will be 0.

FRICTION BRAKE FORCE HOLD 3C

INPUTS:

TRUCK REQUIRED BCP—This signal gives the brake cylinder pressure value being commanded on the respective truck.

WHEEL SLIP ENABLE—This signal is the output B-1 from Module B. This signal is a logical "1", when the respective axle is working on correction of a slide ("enabled"). This signal is a logical "0" under normal non-sliding condition ("disabled").

PROCESS:

This function is used to hold the respective truck's friction brake force level in effect at the time the axle's slide control is enabled. This becomes the basis for the proportional force reduction throughout each particular axle slide correction.

OUTPUT:

When the input from B-1 transitions from a logical "0" to a logical "1", this function will hold the value from the Truck Required BCP as it's output until B-1 transitions from a logical "1" to a logical "0". While B-1 is equal to a logical "0", the output of this function will be 0.

ELECTRIC BRAKE FORCE STEP 4C

INPUTS:

ELECTRIC BRAKE FORCE HOLD—This signal comes from 2C. During the respective axles slide correction, this value is the dynamic braking force in effect at the detection of the slide.

PROCESS:

This function defines the electric brake force reduction step size for each individual slide correction. The step size is ⅛th of the electric brake force in effect at the time the slide was detected.

OUTPUT:

Output=2C/8

FRICTION BRAKE FORCE STEP 5C

INPUTS:

FRICTION BRAKE FORCE HOLD—This signal comes from 3C During the respective axles slide correction, this value is the friction braking force in effect at the detection of the slide.

PROCESS:

This function defines the friction brake force reduction step size for each individual slide correction. The step size is ⅛th of the friction brake force in effect at the time the slide was detected.

OUTPUT:

Output=3C/8

ELECTRIC BRAKE INITIAL FORCE REDUCTION 6C

INPUTS:

ELECTRIC BRAKE FORCE HOLD—This signal comes from 2C During the respective axles slide correction, this value is the dynamic braking force in effect at the detection of the slide.

ELECTRIC BRAKE FORCE STEP—This signal comes from 4C. This signal is the electric brake force step value which will be used to calculate an electric brake force reduction. Proportional Prediction—This signal is the output A-2 from Module A. It gives the predicted value of force steps to be used for the initial dynamic brake force reduction.

PROCESS:

This function gives the value of the first dynamic brake force reduction used in controlling a slide.

OUTPUT:

Output=2C−(A-2*4C)

This output is limited so that it will not be less than 0.

FRICTION BRAKE INITIAL FORCE REDUCTION 7C

INPUT:

FRICTION BRAKE FORCE HOLD—This signal comes from 3C. During the respective axles slide correction, this value is the friction braking force in effect at the detection of the slide.

FRICTION BRAKE FORCE STEP—this signal comes from 5C. This signal is the friction brake force step value which will be used to calculate a friction brake force reduction.

Proportional Prediction—This signal is the output A-2 from Module A. It gives the predicted value of force steps to be used for the initial friction brake force reduction.

PROCESS:

This function gives the value of the first friction brake force reduction used in controlling a slide.

OUTPUT:

Output=3C−(A-2*5C)

This output is limited so that it will not be less than 0.

ELECTRIC BRAKE STEP DOWN 8C

INPUTS:

ELECTRIC BRAKE FORCE STEP—This signal comes from 4C. This signal is the electric brake force step value which will be used to calculate an electric brake force reduction.

ELECTRIC BRAKE INITIAL FORCE REDUCTION—This signal comes from 6C. This signal is the initial electric brake force prediction at the detection of a slide.

FORCE STEP DOWN INDICATION—This signal is the output B-2 from Module B. It gives the amount of steps needed beyond the initial dynamic brake force reduction needed to correct the slide.

PROCESS:

This function gives the additional value of the electric brake force reduction used in controlling a slide.

OUTPUT:

Output=6C−(B-2*4C)

This output is limited so that it will not be less than 0.

FRICTION BRAKE STEP DOWN 9C

INPUTS:

FRICTION BRAKE FORCE STEP—This signal comes from 5C. This signal is the friction brake force step value which will be used to calculate a friction brake force reduction.

FRICTION BRAKE INITIAL FORCE REDUCTION—This signal comes from 7C This signal is the initial friction brake force prediction at the detection of a slide.

FORCE STEP DOWN INDICATION—This signal is the output B-2 from Module B. It gives the amount of steps needed beyond the initial friction brake force reduction needed to correct the slide.

PROCESS:

This function gives the additional value of the friction brake force reduction used in controlling a slide.

OUTPUT:

Output=7C−(B-2*5C)

This output is limited so that it will not be less than 0.

PPS FORCE MODULATION COMMANDS & ZERO SPEED—MODULE D (FIG. 4)

Note; the function of this module will be performed on a per vehicle basis.

FRICTION BRAKE TRUCK 1 PER AXLE TO PER TRUCK DETERMINATION 1D

INPUTS:

FRICTION BRAKE STEP DOWN AXLE 1—This signal is C-1 from Module C Axle 1. This signal is the additional value of the friction brake force reduction needed to control the slide on axle 1.

FRICTION BRAKE STEP DOWN AXLE 2—This signal is C-1 from Module C Axle 2. This signal is the additional value of the friction brake force reduction needed to control the slide on axle 2.

TRUCK 1 REQUIRED BCP—the signal gives the brake cylinder pressure value being commanded on truck 1.

TRUCK 1 ENABLE OR—This is the input from 3D. If any axle on truck 1 is working to control a slide this signal will be a logical "1". If none of the axles on truck 1 are working to control a slide this signal will be a logical "0".

PROCESS:

This function determines which axle will have priority for friction brake force reduction during any truck 1 slide control action. The axle having the most severe slide (i.e., the one calling for the greatest friction braking force reduction) will be responsible for the truck 1 friction brake force reduction.

OUTPUT:

If 3D is equal to a logical "1", the output of this function will be the lowest value input from C-1 Axle 1 and C-1 Axle 2. If 3D is equal to a logical "0", the output of this function will be the input from the Truck 1 Required BCP. The output of this function will become the Truck 1 Required BCP and will be sent to the BCP Feedback Summing Point for Truck 1.

ELECTRIC BRAKE TRUCK 1 PER AXLE TO PER TRUCK DETERMINATION 2D

INPUTS:

ELECTRIC BRAKE STEP DOWN AXLE 1—This signal is C-2 from Module C Axle 1. This signal is the final value of the electric brake force reduction needed to control the slide on axle 1.

ELECTRIC BRAKE STEP DOWN AXLE 2—This signal is C-2 from Module C Axle 2. This signal is the final value of the electric brake force reduction needed to control the slide on axle 2.

TRUCK 1 ENABLE OR—This is the input from 3D. If any axle on truck 1 is working to control a slide this signal will be a logical "1". If none of the axles on truck 1 are working to control a slide this signal will be a logical "0".

PROCESS:

This function determines which axle will have priority for electric brake force reduction during any truck 1 slide control action. The axle having the most severe slide (i.e., the one calling for the greatest electric braking force reduction) will be responsible for the truck 1 electric brake force reduction.

OUTPUT:

If 3D is equal to a logical "1", the output of this function will be the lowest value input from C-2 Axle 1 and C-2 Axle 2. If 3D is equal to a logical "0", the output of this function will be 100%. The output of this function will be SSLIM output sent to the propulsion control of Truck 1.

TRUCK 1 ENABLE OR 3D

INPUTS:

WHEEL SLIP ENABLE AXLE 1—This signal is the output B-1 from Module B Axle 1. This signal is a logical "1", when the respective axle is working on correction of a slide ("enabled"). This signal is a logical "0" under normal non-sliding condition ("disabled").

WHEEL SLIP ENABLE AXLE 2—This signal is the output B-1 from Module B Axle 2. This signal is a logical "1", when the respective axle is working on correction of a slide ("enabled"). This signal is a logical "0" under normal non-sliding condition ("disabled").

PROCESS:

This function determines if either of the two axles on truck 1 are enabled to control a slide.

OUTPUT:

If B-1 Axle 1 OR B-1 Axle 2 are a logical "1", the output of this function will be a logical "1". Otherwise, if both inputs are a logical "0", the output of this function will be a logical "0".

ZERO SPEED DETERMINATION (ZSPD) 4D

INPUTS:

WHEEL SLIP ENABLE AXLE 1—This signal is the output B-1 from Module B of axle 1. A logical "1" indicates the wheel slip control is enabled (i.e., actively controlling a slip). A logical "0" indicates the wheel slip is disabled (i.e., not controlling a slip).

WHEEL SLIP ENABLE AXLE 2—This signal is the output B-1 from Module B of axle 2. A logical "1" indicates the wheel slip control is enabled (i.e., actively controlling a slip). A logical "0" indicates the wheel slip is disabled (i.e., not controlling a slip).

WHEEL SLIP ENABLE AXLE 3—This signal is the output B-1 from Module B of axle 3. A logical "1" indicates the wheel slip control is enabled (i.e., actively controlling a slip). A logical "0" indicates the wheel slip is disabled (i.e., not controlling a slip).

WHEEL SLIP ENABLE AXLE 4—This signal is the output B-1 from Module B of axle 4. A logical "1" indicates the wheel slip control is enabled (i.e., actively controlling a slip). A logical "0" indicates the wheel slip is disabled (i.e., not controlling a slip).

HIGHEST AXLE SPEED (HAS)—This signal is output E-5 from Module E. This signal is the highest axle speed signal of the four.

PROCESS:

Below a 3 MPH vehicle speed, wheel slip control is not needed and can cause unnecessary brake force reduction. This function is used to determine if the vehicle is below 3 MPH and that this is not caused by slips on all axles.

OUTPUT:

If the input B-1 from Module B for Axle 1, Axle 2, Axle 3, AND Axle 4 are all equal to a logical "0" AND the input E-5 from Module E is less than 3.5 MPH, then the output of this function will be a logical "1". If an input B-1 from Module B for Axle 1, Axle 2, Axle 3, OR Axle 4 is equal to a logical "1" AND the input E-5 from Module E is less than 3.5 MPH, then the output of this function will be a logical "0" for 2.0 seconds and then become a logical "1". Any other condition will result in an output of a logical "0" from this function. The output from this function will be sent to other modules as D-1.

FRICTION BRAKE TRUCK 2 PER AXLE TO PER TRUCK DETERMINATION 5D

INPUTS:

FRICTION BRAKE STEP DOWN AXLE 3—This signal is C-1 from Module C Axle 3. This signal is the final value of the friction brake force reduction needed to control the slide on axle 3.

FRICTION BRAKE STEP DOWN AXLE 4—This signal is C-1 from Module C Axle 4. This signal is the final value of the friction brake force reduction needed to control the slide on axle 4.

TRUCK 2 REQUIRED BCP—This signal gives the brake cylinder pressure value being commanded on truck 2.

TRUCK 2 ENABLE OR—This is the input from 7D. If any axle on truck 2 is working to control a slide this signal will be a logical "1". If none of the axles on truck 2 are working to control a slide this signal will be a logical "0".

PROCESS:

This function determines which axle will have priority for friction brake force reduction during any truck 2 slide control action. The axle having the most severe slide (i.e., the one calling for the greatest friction braking force reduction) will be responsible for the truck 2 friction brake force reduction.

OUTPUT:

If 7D is equal to a logical "1", the output of this function will be the lowest value input from C-1 Axle 3 and C-1 Axle 4. If 7D is equal to a logical "0", the output of this function will be the input from the Truck 2 Required BCP. The output of this function will become the Truck 2 Required BCP and will be sent to the BCP Feedback Summing Point for Truck 2.

ELECTRIC BRAKE TRUCK 2 PER AXLE TO PER TRUCK DETERMINATION 6D

INPUTS:

ELECTRIC BRAKE STEP DOWN AXLE 3—This signal is C-2 from Module C Axle 3. This signal is the final value of the electric brake force reduction needed to control the slide on axle 3.

ELECTRIC BRAKE STEP DOWN AXLE 4—This signal is C-2 from Module C Axle 4. This signal is the final value of the electric brake force reduction needed to control the slide on axle 4.

TRUCK 2 ENABLE OR—this is the input from 7D. If any axle on truck 2 is working to control a slide this signal will be a logical "1". If none of the axles on truck 2 are working to control a slide this signal will be a logical "0".

PROCESS:

This function determines which axle will have priority for electric brake force reduction during any truck 2 slide control action. The axle having the most severe slide (i.e., the one calling for the greatest electric braking force reduction) will be responsible for the truck 2 electric brake force reduction.

OUTPUT:

If 7D is equal to a logical "1", the output of this function will be the lowest value input from C-2 Axle 3 and C-2 Axle 4. If 7D is equal to a logical "0", the output of this function will be 100%. The output of this function will be SSLIM output sent to the propulsion control of truck 2.

TRUCK 2 ENABLE OR 7D

INPUTS:

WHEEL SLIP ENABLE AXLE 3—This signal is the output B-1 from Module B Axle 3. This signal is a logical "1", when the respective axle is working on correction of a slide ("enabled"). This signal is a logical "0" under normal non-sliding condition ("disabled").

WHEEL SLIP ENABLE AXLE 4—This signal is the output B-1 from Module B Axle 4. This signal is a logical "1", when the respective axle is working on correction of a slide ("enabled"). This signal is a logical "0" under normal non-sliding condition ("disabled").

PROCESS:

This function determines if either of the two axles on truck 2 are enabled to control a slide.

OUTPUT:

If B-1 Axle 3 OR B-1 Axle 4 are a logical "1", the output of this function will be a logical "1". Otherwise, if both inputs are a logical "0", the output of this function will be a logical "0".

PSS HIGHEST AXLE SPEED & SPEED NORMALIZATION—MODULE E (FIG. 5)

Note; the function of this module will be performed on a per vehicle basis.

NORMALIZATION ENABLE 1E
INPUTS:

CAR IN SPIN—This signal indicates if any of the vehicles axles are in a spin condition.

AXLE 1 RATE—This signal is the acceleration/deceleration rate of the wheel/axle set which is being monitored for slippage. It is developed from the differentiation of the speed signal which is externally supplied to the unit using this process by an outside source (i.e., speed pickup).

AXLE 2 RATE—This signal is the acceleration/deceleration rate of the wheel/axle set which is being monitored for slippage. It is developed from the differentiation of the speed signal which is externally supplied to the unit using this process by an outside source (i.e., speed pickup).

AXLE 3 RATE—This signal is the acceleration/deceleration rate of the wheel/axle set which is being monitored for slippage. It is developed from the differentiation of the speed signal which is externally supplied to the unit using this process by an outside source (i.e., speed pickup).

AXLE 4 RATE—This signal is the acceleration/deceleration rate of the wheel/axle set which is being monitored for slippage. It is developed from the differentiation of the speed signal which is externally supplied to the unit using this process by an outside source (i.e., speed pickup).

PWR/BRK—This signal indicates whether the car is in power ("1") or in brake ("0").

HIGHEST AXLE SPEED (HAS)—This signal is output E-5 from Module E. This signal is the highest axle speed signal of the four.

PROCESS:

Wheel speed normalization is used to remove the relative wheel speed difference found on a vehicle's axles due to differences in wheel diameter. This function is used to determine the optimum time to perform the wheel speed normalization process. A time when none of the axles are slipping or spinning is the optimum time.

OUTPUT:

If the car is not in a spin condition AND the Axle Rate input from Axle 1, Axle 2, Axle 3, and Axle 4 are all less than 3.2 MPHPS AND input from PWR/BRK is equal to a logical "1" AND the input from 10E is greater than 35 MPH AND this function had an output of a logical "0" on the previous program cycle, then this function will have an output of a logical "1". For any other conditions this function will have an output of a logical "0".

AXLE 1 NORMALIZATION FACTOR 2E
INPUTS:

NORMALIZATION ENABLE—This signal is the output of function 1E. When the conditions are right to recalculate the normalization scaling factor, this signal will be a logical "1". All other times, this signal will be a logical "0".

HIGHEST AXLE SPEED (HAS)—This signal is output E-5 from Module E. This signal is the highest axle speed signal of the four.

RAW AXLE SPEED 1—This signal is the speed of the wheel/axle set which is being monitored for slippage. It is externally supplied to the unit by an outside source (i.e., speed pickup).

PROCESS:

This function is used to calculate the wheel speed normalization factor for axle 1. When this factor is calculated, it is clamped so that it cannot change any more than ±2% from it's previous value. This is used to minimize the effect of an anomalous speed signal right at the moment the factor is being calculated.

OUTPUT:

If the input from 1E is equal to a logical "0", then the output of this function will be the previous program cycles output from this function. If the input from 1E is equal to a logical "1", then the output of this function is calculated in the following manner:

The output from this function will be equal to the input from 10E (i.e., the highest axle speed) divided by the Raw Axle Speed of axle 1, provided that this calculation is within ±2% of this function's previous program cycle output. If the calculation is not within ±2% of this function's previous program cycle output it will be limited to 102% or 98% respectively, of this function's previous program cycle output.

AXLE 2 NORMALIZATION FACTOR 3E
INPUTS:

NORMALIZATION ENABLE—This signal is the output of function 1E. When the conditions are right to recalculate the normalization scaling factor, this signal will be a logical "1". All other times, this signal will be a logical "0".

HIGHEST AXLE SPEED (HAS)—this signal is output E-5 from Module E. This signal is the highest axle speed signal of the four.

RAW AXLE SPEED 2—This signal is the speed of the wheel/axle set which is being monitored for slippage. It is externally supplied to the unit by an outside source (i.e., speed pickup).

PROCESS:

This function is used to calculate the wheel speed normalization factor for axle 2. When this factor is calculated, it is clamped so that it cannot change any more than ±2% from it's previous value. This is used to minimize the effect of an anomalous speed signal right at the moment the factor is being calculated.

OUTPUT:

If the input from 1E is equal to a logical "0", then the output of this function will be the previous program cycles output from this function. If the input from 1E is equal to a logical "1", then the output of this function is calculated in the following manner:

The output from this function will be equal to the input from 10E (i.e., the highest axle speed) divided by the Raw Axle Speed of axle 2, provided that this calculation is within ±2% of this function's previous program cycle output. If the calculation is not within ±2% of this function's previous program cycle output it will be limited to 102% or 98% respectively, of this function's previous program cycle output.

AXLE 3 NORMALIZATION FACTOR 4E
INPUTS:

NORMALIZATION ENABLE—This signal is the output of function 1E. When the conditions are right to recalculate the normalization scaling factor, this signal will be a logical "1". All other times, this signal will be a logical "0".

HIGHEST AXLE SPEED (HAS)—This signal is output E-5 from Module E. This signal is the highest axle speed signal of the four.

RAW AXLE SPEED 3—This signal is the speed of the wheel/axle set which is being monitored for slippage. It is externally supplied to the unit by an outside source (i.e., speed pickup).

PROCESS:

This function is used to calculate the wheel speed normalization factor for axle 3. When this factor is calculated, it is clamped so that it cannot change any more than ±2% from it's previous value. This is used to minimize the effect of an anomalous speed signal right at the moment the factor is being calculated.

OUTPUT:

If the input from 1E is equal to a logical "0", then the output of this function will be the previous program cycles output from this function. If the input from 1E is equal to a logical "1", then the output of this function is calculated in the following manner:

The output from this function will be equal to the input from 10E (i.e., the highest axle speed) divided by the Raw Axle Speed of axle 3, provided that this calculation is within ±2% of this function's previous program cycle output. If the calculation is not within ±2% of this function's previous program cycle output it will be limited to 102% or 98% respectively, of this function's previous program cycle output.

AXLE 4 NORMALIZATION FACTOR 5E

INPUTS:

NORMALIZATION ENABLE—This signal is the output of function 1E. When the conditions are right to recalculate the normalization scaling factor, this signal will be a logical "1". All other times, this signal will be a logical "0".

HIGHEST AXLE SPEED (HAS)—This signal is output E-5 from Module E. This signal is the highest axle speed signal of the four.

RAW AXLE SPEED 4—This signal is the speed of the wheel/axle set which is being monitored for slippage. It is externally supplied to the unit by an outside source (i.e., speed pickup).

PROCESS:

This function is used to calculate the wheel speed normalization factor for axle 4. When this factor is calculated, it is clamped so that it cannot change any more than ±2% from it's previous value. This is used to minimize the effect of an anomalous speed signal right at the moment the factor is being calculated.

OUTPUT:

If the input from 1E is equal to a logical "0", then the output of this function will be the previous program cycles output from this function. If the input from 1E is equal to a logical "1", then the output of this function is calculated in the following manner:

The output from this function will be equal to the input from 10E (i.e., the highest axle speed) divided by the Raw Axle Speed of axle 4, provided that this calculation is within ±2% of this function's previous program cycle output. If the calculation is not within ±2% of this function's previous program cycle output it will be limited to 102% or 98% respectively, of this function's previous program cycle output.

AXLE 1 NORMALIZED SPEED 6E

INPUTS:

AXLE 1 NORMALIZATION FACTOR—This signal is the output of function 2E. This signal is the scaling factor used to normalize the respective axle speed.

RAW AXLE SPEED 1—This signal is the speed of the wheel/axle set which is being monitored for slippage. It is externally supplied to the unit by an outside source (i.e., speed pickup).

PROCESS:

This function is used to multiply the scale factor times the raw axle speed, producing a normalized axle speed for axle 1.

OUTPUT:

The output of this function will the multiplication of the input from Raw Axle Speed 1 times the input from 2E. This function produces output E-1 which is used by other modules.

AXLE 2 NORMALIZED SPEED 7E

INPUTS:

AXLE 2 NORMALIZATION FACTOR—This signal is the output of function 3E. This signal is the scaling factor used to normalize the respective axle speed.

RAW AXLE SPEED 2—This signal is the speed of the wheel/axle set which is being monitored for slippage. It is externally supplied to the unit by an outside source (i.e., speed pickup).

PROCESS:

This function is used to multiply the scale factor times the raw axle speed, producing a normalized axle speed for axle 2.

OUTPUT:

The output of this function will the multiplication of the input from Raw Axle Speed 2 times the input from 3E. This function produces output E-2 which is used by other modules.

AXLE 3 NORMALIZED SPEED 8E

INPUTS:

AXLE 3 NORMALIZATION FACTOR—This signal is the output of function 4E. This signal is the scaling factor used to normalize the respective axle speed.

RAW AXLE SPEED 3—This signal is the speed of the wheel/axle set which is being monitored for slippage. It is externally supplied to the unit by an outside source (i.e., speed pickup).

PROCESS:

This function is used to multiply the scale factor times the raw axle speed, producing a normalized axle speed for axle 3.

OUTPUT:

The output of this function will the multiplication of the input from Raw Axle Speed 3 times the input from 4E. This function produces output E-3 which is used by other modules.

AXLE 4 NORMALIZED SPEED 9E

INPUTS:

AXLE 4 NORMALIZATION FACTOR—This signal is the output of function 5E. This signal is the scaling factor used to normalize the respective axle speed.

RAW AXLE SPEED 4—This signal is the speed of the wheel/axle set which is being monitored for slippage. It is externally supplied to the unit by an outside source (i.e., speed pickup).

PROCESS:

This function is used to multiply the scale factor times the raw axle speed, producing a normalized axle speed for axle 4.

OUTPUT:

The output of this function will the multiplication of the input from Raw Axle Speed 4 times the input from 5E . This function produces output E-4 which is used by other modules.

HIGHEST AXLE SPEED (HAS) 10E
INPUTS:
NORMALIZED AXLE SPEED 1—This signal is the speed of wheel/axle set 1, after it has been normalized to correct for wheel size differences.
NORMALIZED AXLE SPEED 2—This signal is the speed of wheel/axle set 2, after it has been normalized to correct for wheel size differences.
NORMALIZED AXLE SPEED 3—This signal is the speed of wheel/axle set 3, after it has been normalized to correct for wheel size differences.
NORMALIZED AXLE SPEED 4—This signal is the speed of wheel/axle set 4, after it has been normalized to correct for wheel size differences.

PROCESS:
This function is used to compare all of the vehicle's normalized axle speeds and select the highest for an output.

OUTPUT:
The output of this function will the greatest of the four inputs from 6E, 7E, 8E, and 9E. This function produces output E-5 which is used by other modules.

The following communication lines are defined in FIG. 1 through FIG. 5.

L1A is the output of 1A.
L2A is the output of 2A.
L3A is the output of 3A.
L4A is the output of 4A.
L5A is the output of 5A.
A-2 is the output of 6A.
L7A is the output of 7A.
L8A is the output of 8A.
L9A is the output of 9A.
A-1 is the output of 10A.
L1B is the output of 1B.
L2B is the output of 2B.
L3B is the output of 3B.
B-1 is the output of 4B.
B-2 is the output of 5B.
L1C is the output of 1C.
L2C is the output of 2C.
L3C is the output of 3C.
L4C is the output of 4C.
L5C is the output of 5C.
L6C is the output of 6C.
L7C is the output of 7C.
C-2 is the output of 8C.
C-1 is the output of 9C.
L1D is the output of 1D.
L2D is the output of 2D.
L3D is the output of 3D.
D-1 is the output of 4D.
L5D is the output of 5D.
L6D is the output of 6D.
L7D is the output of 7D.
L1E is the output of 1E.
L2E is the output of 2E.
L3E is the output of 3E.
L4E is the output of 4E.
L5E is the output of 5E.
E-1 is the output of 6E.
E-2 is the output of 7E.
E-3 is the output of 8E.
E-4 is the output of 9E.
E-5 is the output of 10E.

If this invention is implemented in a system which uses discrete electrical circuits to accomplish the functions indicated, these communication lines would be wires or like connections. If the invention is implemented in a microprocessor, the various functional parts of which the modules are made, such as 1A, 2A, etc would be lines of computer code in the microprocessor. For this case, the function of the communication lines such as L1A, etc would be accomplished by one functional part of the program writing information to the memory of the microprocessor, and another functional part of the program reading the information from the memory.

It will be apparent to one skilled in the art that the invention discussed above in a specific embodiment, has the following aspects and features.

One aspect of the invention is to provide a wheel slip control system having apparatus for identifying a time when wheel slip is not occurring, for any of the axles, 1E. At that time, the apparatus generates signals indicating wheel diameter based on relative axle velocities for all the axles on the railway vehicle during the time when wheel slip was not occurring, 2E, 3E, 4E, and 5E. From this information, the apparatus generates signals representing normalized axle speeds, 6E, 7E, 8E, and 9E and identifies any axle as slipping which has a normalized axle speed less than the highest normalized axle speed. This is done in 8A and 9A.

In a further aspect, the invention provides a wheel slip control system for a railway vehicle having a plurality of trucks on which the axles are mounted, and which provides brake reduction signals independently to each of the trucks, and which provides the a signal only for a truck having an axle in a wheel slip condition.

In a further aspect, the invention provides a wheel slip control system for a railway vehicle having both friction brakes and dynamic brakes. The first signal for brake reduction and the second signal for brake reduction are combined in an apparatus, 5B which produces a proportional signal which is used equally to reduce the application forces of both the friction brakes and the dynamic brakes.

In another aspect, the invention provides a wheel slip control system with apparatus, 2B for determining that a wheel slip condition is no longer in effect based on a polarity shift in the acceleration rate of the axle.

In another aspect, the invention provides a wheel slip control system with apparatus 2B for determining that a wheel slip condition is no longer in effect based on a polarity shift in the acceleration rate of the axle from positive to negative.

In yet another aspect, the invention provides a wheel slip control system in which the apparatus includes a timer, 3B for determining the duration of a wheel slip condition, and the apparatus provides a brake reduction signal which increases with the duration of the wheel slip condition, up to a maximum predetermined time.

In yet another aspect, the invention provides a wheel slip control system in which the apparatus includes a timer, 3B for determining the duration of a wheel slip condition, and the apparatus provides a brake reduction signal which increases with the duration of the wheel slip condition, up to a maximum predetermined time, at which time the timer is reset to zero.

In a further aspect, the invention provides a wheel slip control system in which the apparatus generating signals for brake reduction, 5B provides signals which indicate discrete brake reduction steps.

In a further aspect, the invention provides a wheel slip control system for modulating brakes on a passenger transit railway vehicle having a plurality of trucks on which a plurality of axles are mounted, wheels being mounted on the axles. The wheel slip control system includes apparatus, 1E, 2E, 3E, 4E, and 5E for receiving signals indicating speeds of each of the axles, and apparatus 1A, 2A, and 5A for receiving acceleration rates of each of the axles, apparatus, 2E, 3E, 4E, and 5E for calculating signals representing normalization factors for all the axles on the railway vehicle, and a normalized speed signal for each axle, 6E, 7E, 8E, and 9E which eliminates speed differences due to different wheel diameters. The system also includes apparatus, 3A, 7A, and 8 for utilizing the normalized speed signal of each axle and apparatus 1A, 2A for receiving signals indicating the rotational accelerations of the axles to generate signals indicating wheel slip. The system also includes apparatus, 5A which responds to the signals which indicate wheel slip and the signals which indicate the rotational accelerations of the axles to generate a signal which indicates the severity of wheel slip, for each of the axles. The system also includes apparatus 6A which responds to the signals which indicate the severity of wheel slip and generate a first signal for brake reduction, for each of the axles. The system also has a timer 3B which responds to the signals which indicate wheel slip and generates a signal which indicates the time that a wheel slip condition has been in effect. The system also has apparatus, 2B which analyzes the rotational accelerations of each of the axles and generates signals which indicate that an axle which has been in a wheel slip condition has been corrected. The system also includes apparatus which receives the signals indicating the time that a wheel slip condition has been in effect, and the signal which indicates that wheel slip has been corrected, 4B and 5B and generates a second signal for brake reduction. This is combined with the first signal to generate a third signal for brake reduction. This is done for each of the axles. The system also has apparatus, 3D and 7D which determines, for each truck, whether one of the axles on it is in a wheel slip condition. If that is the case, the apparatus applies the third signal for brake reduction to both of the axles on the truck.

In yet another aspect, the invention provides a method for modulating brakes for wheel slip correction on a passenger transit railway vehicle having a plurality of axles, on which wheels are mounted. The method includes receiving signals indicating speeds and acceleration rates of each of the axles, processing the signals and generating signals indicating, for each of the axles, whether or not the wheels are slipping. The method also includes using the signals indicating wheel slip and the signals indicating speeds and acceleration rates to generate, for each of the axles, signals which indicate the severity of wheel slip, and using the signals which indicate the severity of wheel slip to generate, for each of the axles, a first signal for brake reduction. The method also includes timing to determine how long a wheel slip of any axle has been in effect, and, from this, generating a second signal for brake reduction. The method uses the first signal for brake reduction and the second signal for brake reduction to modulate the application forces of brakes.

In still another aspect, the invention provides a wheel slip correction method in which a time is identified when wheel slip is known to not be occurring. At that time, the velocities of the wheels are compared to obtain normalization signals which represent the relative diameters of the wheels. From this, normalized axle speeds are obtained, and any axle which has a normalized speed less than the maximum is indicated as being in a wheel slip condition.

In another aspect, the invention provides a wheel slip correction method for a railway vehicle which has a plurality of trucks on which the axles are mounted, the method providing signals independently to each of the trucks, and in which the brake reduction is made only for a truck having an axle in a wheel slip condition.

In a further aspect, the invention provides a wheel slip control method for a railway vehicle which has both friction brakes and dynamic brakes, and in which the method of brake reduction supplies proportional brake reduction signals equally to both the friction and dynamic brakes.

In a further aspect, the invention provides a wheel slip control method which includes the step of determining that a wheel slip condition is no longer in effect based on a polarity shift in the axle acceleration rate.

In a further aspect, the invention provides a wheel slip control method which includes the step of determining that a wheel slip condition is no longer in effect based on a polarity shift in the axle acceleration rate from positive to negative.

In a further aspect, the invention provides a wheel slip correction method in which the brake reduction is increased the longer the time that a wheel slip condition has been in effect, up to a maximum predetermined time.

In a further aspect, the timing means is reset to zero after a predetermined time. This is done to prevent spurious signals indicating wheel slip from preventing a needed brake application.

In a further aspect, the invention provides a wheel slip correction method in which the brake reduction is done in discrete steps.

In yet another aspect, the invention provides a method for modulating brakes for wheel slip correction on a passenger transit railway vehicle having a plurality of trucks on which a plurality of axles are mounted, with wheels mounted on the axles, the method including the step of receiving signals indicating speeds and acceleration rates of each of the axles, and calculating signals representing normalization factors for all the axles on the railway vehicle, and a normalized speed signal for each axle, which eliminates speed differences due to different wheel diameters. The method also includes utilizing the normalized signal of each axle and the signals indicating the rotational accelerations of the axles to generate signals indicating wheel slip. The method further includes responding to the signals indicating wheel slip and the signals indicating the rotational accelerations of the axles and generating a signal indicating the severity of the wheel slip, for each of the axles. The method also includes responding to the signals indicating the severity of wheel slip and generating a first signal for brake reduction, for each of the axles. The method also includes using the signals indicating wheel slip to start a timer and generate a signal indicating the time that a wheel slip condition has been in effect, and responding to the rotational accelerations of each of the axles to generate signals indicating wheel slip which is being corrected. The method also includes responding to the signals indicating the time that a wheel slip condition has been in effect, and the signal indicating wheel slip which is being corrected, and generating a second signal for brake reduction for each of the axles. The method also includes responding to the first signal for brake reduction and the second signal for brake reduction to generate, for each of the axles, a third signal for brake reduction, and for each truck, selecting, for all of the axles on the truck, the largest value of the third signal for brake reduction, and using the largest value to modulate the brakes on all of the axles on the truck.

The foregoing description of the invention has been quite detailed, to enable a person skilled in the art to practice the invention. It is not intended to limit the scope of the invention, which is defined by the following claims.

We claim:

1. A wheel slip control system for modulating brake application forces on a passenger transit type railway vehicle having a plurality of axles on which wheels are mounted, said wheel slip control system comprising:
   (a) means for receiving signals indicative of speeds and acceleration rates of each of such axles;
   (b) means for processing such signals indicative of speeds and acceleration rates and generating signals indicating, for each of such axles, whether or not such wheels are slipping, said means such axles, whether or not such wheels are slipping, said means including:
      (I) means for identifying a time when wheel slip is not occurring, for any of such plurality of axles,
      (II) means for venerating signals indicative of relative wheel diameter based on relative axle speeds for all of such axles on such railway vehicle during said time when wheel slip is not occurring,
      (III) means for generating signals indicative of normalized axle speeds based on said signals indicative of relative wheel diameters and such axle speeds;
      (IV) means for selecting a highest one of said normalized axle speeds and for generating a signal indicating wheel slip for any axle having a normalized axle speed less than said highest normalized axle speed;
   (c) means responsive to said signals indicating wheel slip and such signals indicative of speeds and acceleration rates and generating, for each of such axles, signals indicative of severity of wheel slip;
   (d) means responsive to said signals indicative of severity of wheel slip for generating, for each of such axles, a first signal for brake reduction;
   (e) timing means, for each of such axles, responsive to said signals indicative of whether or not such wheels are slipping to generate a signal indicative of a duration of time that a wheel slip condition has been in effect;
   (f) for each of such axles, means responsive to said signals indicative of a duration of time that a wheel slip condition has been in effect, for generating a second signal for brake reduction, said second signal for brake reduction providing for increasing brake reduction the longer that a wheel slip condition is in effect, up to a maximum predetermined time; and
   (g) means responsive to said first signal for brake reduction and said second signal for brake reduction to modulate such application forces of such brakes.

2. The wheel slip control system of claim 1 wherein said railway vehicle has a plurality of trucks on which said axles are mounted, and wherein said means responsive to said first signal for brake reduction and said second signal for brake reduction provides signals independently to each of such trucks, and wherein said brake reduction is made only for a truck having an axle in a wheel slip condition.

3. The wheel slip control system of claim 1 wherein said railway vehicle has both friction brakes and dynamic brakes, and wherein said first signal for brake reduction and said second signal for brake reduction are combined in a means for producing a proportional signal which is used equally to reduce the application forces of both such friction brakes and such dynamic brakes.

4. The wheel slip control system of claim 1 further characterized as having means for determining that a wheel slip condition is no longer in effect based on a polarity shift in said acceleration rate of said axle.

5. The wheel slip control system of claim 4 wherein said means for determining that a wheel slip condition is no longer in effect uses as a criterion for said condition that wheel slip is no longer in effect an acceleration rate polarity shift from positive to negative.

6. The wheel slip control system of claim 1 wherein said timing means is reset to zero after a predetermined time.

7. The wheel slip control system of claim 1 wherein said means responsive to said first signal for brake reduction and said second signal for brake reduction to modulate such application forces of such brakes operates in discrete brake reduction steps.

8. A wheel slip control system for modulating brakes on a passenger transit railway vehicle having a plurality of trucks on which a plurality of axles are mounted, wheels being mounted on such axles, said wheel slip control system comprising:
   (a) means for receiving signals indicative of speeds and acceleration rates of each of such axles;
   (b) means for calculating a normalized speed signal for each axle, which eliminates speed differences due to different wheel diameters, said means including:
      (I) means for identifying a time when wheel slip is not occurring, for any of such plurality of axles,
      (II) means for generating signals indicative of relative wheel diameter based on relative axle speeds for all of such axles on such railway vehicle during said time when wheel slip is not occurring,
      (III) means for generating said normalized speed signals based on said signals indicative of relative wheel diameter and said axle speeds;
   (c) means for utilizing said normalized speed signal of each such axle and said signals indicative of such rotational accelerations of such axles to generate signals indicative of wheel slip, said means including:
      (I) means for selecting a highest one of said normalized axle speeds, and for identifying as slipping any axle having a normalized axle steed less than said highest normalized axle speed;
   (d) means responsive to said signals indicative of wheel slip and said signals indicative of such rotational accelerations of such axles to generate a signal indicative of the severity of said wheel slip, for each of such axles;
   (e) means responsive to said signals indicative of the severity of said wheel slip for generating a first signal for brake reduction, for each of such axles;
   (f) timing means responsive to said signals indicative of wheel slip to generate a signal indicative of the time that a wheel slip condition has been in effect;
   (g) means responsive to said rotational accelerations of each of such axles to generate signals indicative of wheel slip which is being corrected;
   (h) means responsive to said signals indicative of the time that a wheel slip condition has been in effect, and said signal indicative of wheel slip which is being corrected, for generating a second signal for brake reduction for each of said axles, said second signal for brake force reduction providing for increasing brake reduction the longer that a wheel slip condition is in effect, up to a maximum predetermined time;
   (i) means responsive to said first signal for brake reduction and said second signal for brake reduction to generate, for each of such axles, a third signal for brake reduction; and
   (j) for each truck, means for selecting, for all of such axles on such truck, a largest value of said third signal for brake reduction, and using said third signal to modulate such brakes on all of such axles on such truck.

9. A method for modulating brakes for wheel slip correction on a passenger transit type railway vehicle having a plurality of axles on which wheels are mounted, said method comprising the steps of;
   (a) receiving signals indicative of speeds and acceleration rates of each of such axles;
   (b) processing such signals indicative of speeds and acceleration rates and generating signals indicating, for each of such axles, whether or not such wheels are slipping, said processing including the following steps;
      (I) identifying a time when wheel slip is not occurring, for any of such plurality of axles,
      (II) generating signals indicative of relative wheel diameter based on relative axle speeds for all of such axles on such railway vehicle during said time when wheel slip is not occurring,
      (III) generating signals indicative of normalized axle speeds based on said axle speeds and said relative wheel diameters;
      (IV) selecting a highest normalized axle speed and generating a signal indicating wheel slip for any axle having a normalized axle speed less than said highest normalized axle speed;
   (c) using said signals indicating wheel slip and such signals indicative of speeds and acceleration rates to generate, for each of such axles, signals indicative of severity of wheel slip;
   (d) using said signals indicative of severity of wheel slip to generate, for each of such axles, a first signal for brake reduction;
   (e) timing, for each of such axles, said signals indicative of whether or not such wheels are slipping, to generate a signal indicative of a duration of time that a wheel slip condition has been in effect;
   (f) generating a second signal for brake reduction using said signal indicative of a duration of time that a wheel slip condition has been in effect, said second signal for brake reduction providing for increasing brake reduction the longer that a wheel slip condition is in effect, up to a maximum predetermined time; and
   (g) responding to said first signal for brake reduction and said second signal for brake reduction to modulate such application forces of such brakes.

10. The wheel slip correction method of claim 9 wherein said railway vehicle has a plurality of trucks on which said axles are mounted, and wherein step (g) provides signals independently to each of such trucks, and wherein said brake reduction is made only for a truck having an axle in a wheel slip condition.

11. The wheel slip correction method of claim 9 wherein said railway vehicle has both friction brakes and dynamic brakes, and wherein step (g) is further characterized as providing a proportional signal which is used equally to reduce the application forces of both such friction brakes and such dynamic brakes.

12. The wheel slip correction method of claim 9 further comprising the step of determining that a wheel slip condition is no longer in effect based on a polarity shift in said acceleration rate of said axle.

13. The wheel slip correction method of claim 12 wherein said step of determining that a wheel slip condition is no longer in effect uses as a criterion an acceleration rate polarity shift from positive to negative.

14. The wheel slip correction method of claim 9 wherein step (e) is further characterized as resetting said timing means to zero after a predetermined time.

15. The wheel slip correction method of claim 9 wherein step (g), for modulating such brake application forces, is further characterized as operating in discrete brake reduction steps.

16. A method for modulating brakes for wheel slip correction on a passenger transit railway vehicle having a plurality of trucks on which a plurality of axles are mounted, wheels being mounted on such axles, said method comprising:
   (a) receiving signals indicative of speeds and acceleration rates of each of such axles;
   (b) calculating a normalized speed signal for each axle, which eliminates speed differences due to different wheel diameters said calculating including:
      (I) identifying a time when wheel slip is not occurring, for any of such plurality of axles,
      (II) generating signals indicative of relative wheel diameter based on relative axle speeds for all of such axles on such railway vehicle during said time when wheel slip is not occurring,
      (III) generating said normalized speed signals for such axles based on such axle speeds and said relative wheel diameters;
   (c) the step of utilizing said normalized speed signal of each such axle and said signals indicative of such rotational accelerations of such axles to generate signals indicative of wheel slip, said step including:
      (I) selecting a highest one of said normalized axle speeds and identifying as slipping any axle having a normalized axle speed less than said highest normalized axle speed;
   (d) responding to said signals indicative of wheel slip and such signals indicative of such rotational accelerations of such axles and generating a signal indicative of the severity of said wheel slip, for each of such axles;
   (e) responding to said signals indicative of the severity of said wheel slip and generating a first signal for brake reduction, for each of said axles;
   (f) using said signals indicative of wheel slip to start a timer and generate a signal indicating the time that a wheel slip condition has been in effect;
   (g) responding to said rotational accelerations of each of such axles to generate signals indicative of wheel slip which is being corrected;
   (h) responding to said signals indicative of the time that a wheel slip condition has been in effect, and said signal indicative of wheel slip which is being corrected, and generating a second signal for brake reduction for each of said axles, said second signal for brake reduction providing for increasing brake reduction the longer that a wheel slip condition is in effect, up to a maximum predetermined time;
   (i) responding to said first signal for brake reduction and said second signal for brake reduction to generate, for each of such axles, a third signal for brake reduction; and
   (j) for each truck, selecting, for all of such axles on such truck, a largest value of said third signal for brake reduction, and using said third signal to modulate such brakes on all of such axles on such truck.

* * * * *